(12) United States Patent
Xu et al.

(10) Patent No.: US 12,433,785 B2
(45) Date of Patent: Oct. 7, 2025

(54) GEL PAD ASSEMBLY USING FREE ROTATABLE FLUID JOINTS

(71) Applicant: C. R. Bard, Inc., Franklin Lakes, NJ (US)

(72) Inventors: Qihua Xu, Cary, NC (US); Eric A. Fallows, Apex, NC (US); Adam T. Martin, Holly Springs, NC (US); Nicholas J. Jardine, Holly Springs, NC (US); Sean E. Walker, Platteville, CO (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 796 days.

(21) Appl. No.: 17/678,965

(22) Filed: Feb. 23, 2022

(65) Prior Publication Data

US 2022/0265468 A1    Aug. 25, 2022

Related U.S. Application Data

(60) Provisional application No. 63/152,733, filed on Feb. 23, 2021.

(51) Int. Cl.
| | | |
|---|---|---|
| *A61F 7/00* | (2006.01) | |
| *A61F 7/02* | (2006.01) | |
| *A61F 7/08* | (2006.01) | |

(52) U.S. Cl.
CPC .................. *A61F 7/08* (2013.01); *A61F 7/02* (2013.01); *A61F 2007/0054* (2013.01); *A61F 2007/0219* (2013.01); *A61F 2007/0244* (2013.01)

(58) Field of Classification Search
None
See application file for complete search history.

(56) References Cited

U.S. PATENT DOCUMENTS

| 2,167,865 A | 8/1939 | Beecher |
|---|---|---|
| 2,250,325 A | 7/1941 | Barnes |

(Continued)

FOREIGN PATENT DOCUMENTS

| AU | 678753 B3 | 6/1997 |
|---|---|---|
| AU | 2007201161 B2 | 12/2010 |

(Continued)

OTHER PUBLICATIONS

Murray, R. Z., et al. "Development and use of biomaterials as wound healing therapies" Burns & Trauma (2019) 7:2 https://doi.org/10.1186/s41038-018-0139-7 (2019).

(Continued)

*Primary Examiner* — Linda C Dvorak
*Assistant Examiner* — Nicholas S Borsch
(74) *Attorney, Agent, or Firm* — Rutan & Tucker LLP

(57) ABSTRACT

A medical pad for exchanging thermal energy between a targeted temperature management (TTM) fluid and a patient is disclosed. The pad can include a fluid containing layer and a fluid conduit attached therewith via rotatable joint where the joint is configured to facilitate rotation of the fluid conduit with respect to the pad. A method of manufacturing the pad can include coupling a first member of the rotatable joint to a fluid delivery line, coupling the second member to the fluid containing layer, and inserting the first member within an opening of the second member to facilitate a snap-fit retention mechanism between first member and the second member. A method of using the pad can include rotating the fluid delivery line relative to the thermal pad via the rotatable joint when initially applying the pad to the patient or when adjusting an orientation of the pad on the patient.

29 Claims, 9 Drawing Sheets

(56) References Cited

U.S. PATENT DOCUMENTS

| | | | |
|---|---|---|---|
| 2,296,207 | A | 9/1942 | Young |
| 2,595,328 | A | 5/1952 | Bowen |
| 2,602,302 | A | 7/1952 | Poux |
| 2,726,658 | A | 12/1955 | Chessey |
| 2,807,809 | A | 10/1957 | Kottemann |
| 3,075,529 | A | 1/1963 | Joseph, Jr. |
| 3,091,242 | A | 5/1963 | Johnson, Jr. et al. |
| 3,212,286 | A | 10/1965 | Curtis |
| 3,506,013 | A | 4/1970 | Zdenek |
| 3,734,293 | A | 5/1973 | Biskis |
| 3,830,676 | A | 8/1974 | Elkins |
| 3,867,939 | A | 2/1975 | Moore et al. |
| 3,900,035 | A | 8/1975 | Welch et al. |
| 3,927,671 | A | 12/1975 | Chittenden et al. |
| 3,945,617 | A | 3/1976 | Callery |
| 3,995,621 | A | 12/1976 | Fletcher et al. |
| 4,059,293 | A | 11/1977 | Sipler |
| 4,092,982 | A | 6/1978 | Salem |
| 4,108,146 | A | 8/1978 | Golden |
| 4,114,620 | A | 9/1978 | Moore et al. |
| 4,118,946 | A | 10/1978 | Tubin |
| 4,149,541 | A | 4/1979 | Gammons et al. |
| 4,154,245 | A | 5/1979 | Daily |
| 4,161,210 | A | 7/1979 | Reid et al. |
| 4,195,631 | A | 4/1980 | Baucom |
| 4,311,022 | A | 1/1982 | Hall |
| 4,444,727 | A | 4/1984 | Yanagihara et al. |
| 4,508,123 | A | 4/1985 | Wyatt et al. |
| 4,580,408 | A | 4/1986 | Stuebner |
| 4,753,241 | A | 6/1988 | Brannigan et al. |
| 4,834,705 | A | 5/1989 | Vaillancourt |
| 4,846,176 | A | 7/1989 | Golden |
| 4,867,748 | A | 9/1989 | Samuelsen |
| 4,884,304 | A | 12/1989 | Elkins |
| 4,886,063 | A | 12/1989 | Crews |
| 4,908,248 | A | 3/1990 | Nakashima et al. |
| 4,919,134 | A | 4/1990 | Streeter |
| 4,962,761 | A | 10/1990 | Golden |
| 4,971,056 | A * | 11/1990 | Seacord ............ A61F 7/10 607/104 |
| 4,981,135 | A | 1/1991 | Hardy |
| 4,989,607 | A | 2/1991 | Keusch et al. |
| 5,000,252 | A | 3/1991 | Faghri |
| 5,005,374 | A | 4/1991 | Spitler |
| 5,050,596 | A | 9/1991 | Walasek et al. |
| 5,062,414 | A | 11/1991 | Grim |
| 5,072,875 | A | 12/1991 | Zacoi |
| 5,090,409 | A | 2/1992 | Genis |
| 5,097,829 | A | 3/1992 | Quisenberry |
| 5,111,668 | A | 5/1992 | Parrish et al. |
| 5,113,666 | A | 5/1992 | Parrish et al. |
| 5,133,348 | A | 7/1992 | Mayn |
| 5,146,625 | A | 9/1992 | Steele et al. |
| 5,154,706 | A | 10/1992 | Cartmell et al. |
| 5,190,032 | A | 3/1993 | Zacoi |
| 5,265,669 | A | 11/1993 | Schneider |
| 5,268,022 | A | 12/1993 | Garrett et al. |
| 5,289,695 | A | 3/1994 | Parrish et al. |
| 5,300,103 | A | 4/1994 | Stempel et al. |
| 5,304,213 | A | 4/1994 | Berke et al. |
| 5,304,216 | A | 4/1994 | Wallace |
| 5,320,164 | A | 6/1994 | Szczesuil et al. |
| 5,383,919 | A | 1/1995 | Kelly et al. |
| 5,393,462 | A | 2/1995 | Avery |
| 5,405,366 | A | 4/1995 | Fox et al. |
| 5,407,421 | A | 4/1995 | Goldsmith |
| 5,409,500 | A | 4/1995 | Dyrek |
| 5,411,541 | A | 5/1995 | Bell et al. |
| 5,423,751 | A | 6/1995 | Harrison et al. |
| 5,431,622 | A | 7/1995 | Pyrozyk et al. |
| 5,456,701 | A | 10/1995 | Stout |
| 5,466,250 | A | 11/1995 | Johnson, Jr. et al. |
| 5,470,353 | A | 11/1995 | Jensen |
| 5,476,489 | A | 12/1995 | Koewler |
| 5,484,448 | A | 1/1996 | Steele et al. |
| 5,486,207 | A | 1/1996 | Mahawili |
| 5,514,169 | A | 5/1996 | Dickerhoff et al. |
| 5,545,194 | A | 8/1996 | Augustine |
| 5,566,413 | A | 10/1996 | Webb et al. |
| 5,605,144 | A | 2/1997 | Simmons et al. |
| 5,609,620 | A | 3/1997 | Daily |
| 5,620,482 | A | 4/1997 | Augustine et al. |
| 5,624,477 | A | 4/1997 | Armond |
| 5,634,940 | A | 6/1997 | Panyard |
| 5,640,728 | A | 6/1997 | Graebe |
| 5,645,855 | A | 7/1997 | Lorenz |
| 5,658,325 | A | 8/1997 | Augustine |
| 5,662,695 | A | 9/1997 | Mason et al. |
| 5,683,439 | A | 11/1997 | Jensen |
| 5,720,774 | A | 2/1998 | Glucksman |
| 5,733,318 | A | 3/1998 | Augustine |
| 5,755,755 | A | 5/1998 | Panyard |
| 5,785,716 | A | 7/1998 | Bayron et al. |
| 5,806,335 | A | 9/1998 | Herbert et al. |
| 5,824,025 | A | 10/1998 | Augustine |
| 5,837,002 | A | 11/1998 | Augustine et al. |
| 5,840,080 | A | 11/1998 | Der Ovanesian |
| 5,843,145 | A | 12/1998 | Brink |
| 5,871,526 | A | 2/1999 | Gibbs et al. |
| 5,879,378 | A | 3/1999 | Usui |
| 5,887,437 | A | 3/1999 | Maxim |
| 5,913,849 | A | 6/1999 | Sundstrom et al. |
| 5,948,012 | A | 9/1999 | Mahaffey et al. |
| 5,968,000 | A | 10/1999 | Harrison et al. |
| 5,986,163 | A | 11/1999 | Augustine |
| 5,989,285 | A | 11/1999 | DeVilbiss et al. |
| 6,010,528 | A | 1/2000 | Augustine et al. |
| 6,019,783 | A | 2/2000 | Philips et al. |
| 6,030,412 | A | 2/2000 | Klatz et al. |
| 6,047,106 | A | 4/2000 | Salyer |
| 6,074,415 | A | 6/2000 | Der Ovanesian |
| 6,083,256 | A | 7/2000 | Der Ovanesian |
| 6,083,418 | A | 7/2000 | Czarnecki et al. |
| 6,117,164 | A | 9/2000 | Gildersleeve et al. |
| 6,176,869 | B1 | 1/2001 | Mason et al. |
| 6,176,870 | B1 | 1/2001 | Augustine |
| 6,185,744 | B1 | 2/2001 | Poholski |
| 6,188,930 | B1 | 2/2001 | Carson |
| 6,189,149 | B1 | 2/2001 | Allen |
| 6,189,550 | B1 | 2/2001 | Stickel et al. |
| 6,197,045 | B1 | 3/2001 | Carson |
| 6,234,538 | B1 | 5/2001 | Lauer |
| 6,238,427 | B1 | 5/2001 | Matta |
| 6,255,552 | B1 | 7/2001 | Cummings et al. |
| 6,257,011 | B1 | 7/2001 | Siman-Tov et al. |
| 6,290,716 | B1 | 9/2001 | Augustine |
| 6,336,935 | B1 | 1/2002 | Davis et al. |
| 6,349,560 | B1 | 2/2002 | Maier-Laxhuber et al. |
| 6,352,550 | B1 | 3/2002 | Gildersleeve et al. |
| 6,364,937 | B1 | 4/2002 | McMahon |
| 6,371,976 | B1 | 4/2002 | Vrzalik et al. |
| 6,375,674 | B1 | 4/2002 | Carson |
| 6,389,839 | B1 | 5/2002 | Sabin |
| 6,436,130 | B1 | 8/2002 | Philips et al. |
| 6,451,036 | B1 * | 9/2002 | Heitzmann .... A61B 17/320758 606/159 |
| 6,454,792 | B1 | 9/2002 | Noda et al. |
| 6,461,379 | B1 | 10/2002 | Carson et al. |
| 6,463,212 | B1 | 10/2002 | Salyer |
| 6,503,297 | B1 | 1/2003 | Lu et al. |
| 6,508,831 | B1 | 1/2003 | Kushnir |
| 6,508,859 | B1 | 1/2003 | Zia et al. |
| 6,511,501 | B1 | 1/2003 | Augustine et al. |
| 6,511,502 | B2 | 1/2003 | Fletcher |
| 6,517,510 | B1 | 2/2003 | Stewart et al. |
| D471,987 | S | 3/2003 | Hoglund et al. |
| D472,322 | S | 3/2003 | Hoglund et al. |
| 6,551,348 | B1 * | 4/2003 | Blalock ............ A61F 7/0085 607/104 |
| D474,544 | S | 5/2003 | Hoglund et al. |
| 6,559,096 | B1 | 5/2003 | Smith et al. |
| 6,584,797 | B1 | 7/2003 | Smith et al. |
| 6,591,630 | B2 | 7/2003 | Smith et al. |
| 6,601,404 | B1 | 8/2003 | Roderick |

(56) References Cited

U.S. PATENT DOCUMENTS

| | | |
|---|---|---|
| 6,613,030 B1 | 9/2003 | Coles et al. |
| 6,620,187 B2 | 9/2003 | Carson et al. |
| 6,620,188 B1 | 9/2003 | Ginsburg et al. |
| 6,645,232 B2 | 11/2003 | Carson |
| 6,648,905 B2 | 11/2003 | Hoglund et al. |
| 6,653,607 B2 | 11/2003 | Ellis et al. |
| D483,125 S | 12/2003 | Hoglund et al. |
| 6,660,027 B2 | 12/2003 | Gruszecki et al. |
| 6,669,715 B2 | 12/2003 | Hoglund et al. |
| 6,682,525 B2 | 1/2004 | Lalonde et al. |
| D487,147 S | 2/2004 | Ellingboe et al. |
| D487,148 S | 2/2004 | Ellingboe et al. |
| 6,688,132 B2 | 2/2004 | Smith et al. |
| 6,692,518 B2 | 2/2004 | Carson |
| 6,699,267 B2 | 3/2004 | Voorhees et al. |
| 6,701,724 B2 | 3/2004 | Smith et al. |
| 6,743,250 B2 | 6/2004 | Renfro |
| 6,755,801 B2 | 6/2004 | Utterberg et al. |
| 6,755,852 B2 | 6/2004 | Lachenbruch et al. |
| D492,773 S | 7/2004 | Ellingboe et al. |
| 6,770,848 B2 | 8/2004 | Haas et al. |
| 6,799,063 B2 | 9/2004 | Carson |
| 6,800,087 B2 | 10/2004 | Papay et al. |
| 6,802,855 B2 | 10/2004 | Ellingboe et al. |
| 6,802,885 B2 | 10/2004 | Luk et al. |
| 6,818,012 B2 | 11/2004 | Ellingboe |
| 6,827,728 B2 | 12/2004 | Ellingboe et al. |
| 6,846,322 B2 | 1/2005 | Kane et al. |
| 6,858,068 B2 | 2/2005 | Smith et al. |
| 6,878,156 B1 | 4/2005 | Noda |
| 6,893,453 B2 | 5/2005 | Agarwal et al. |
| 6,904,956 B2 | 6/2005 | Noel |
| 6,909,074 B1 | 6/2005 | Bradley |
| 6,921,198 B2 | 7/2005 | Gruszecki et al. |
| 6,931,875 B1 | 8/2005 | Allen et al. |
| 6,942,644 B2 | 9/2005 | Worthen |
| 6,960,243 B1 | 11/2005 | Smith et al. |
| 6,968,711 B2 | 11/2005 | Smith et al. |
| 6,969,399 B2 | 11/2005 | Schock et al. |
| 7,008,445 B2 | 3/2006 | Lennox |
| 7,022,099 B2 | 4/2006 | Litzie et al. |
| 7,044,960 B2 | 5/2006 | Voorhees et al. |
| 7,052,509 B2 | 5/2006 | Lennox et al. |
| 7,055,575 B2 | 6/2006 | Noel |
| 7,056,335 B2 | 6/2006 | Agarwal et al. |
| 7,063,718 B2 | 6/2006 | Dobak, III |
| 7,077,858 B2 | 7/2006 | Fletcher et al. |
| 7,097,657 B2 | 8/2006 | Noda et al. |
| 7,101,389 B1 | 9/2006 | Augustine et al. |
| 7,122,047 B2 | 10/2006 | Grahn et al. |
| 7,160,316 B2 | 1/2007 | Hamilton et al. |
| 7,172,586 B1 | 2/2007 | Dae et al. |
| 7,240,720 B2 | 7/2007 | Noel |
| 7,303,554 B2 | 12/2007 | Alonde et al. |
| 7,303,579 B2 | 12/2007 | Schock et al. |
| 7,338,516 B2 | 3/2008 | Quincy, III et al. |
| 7,361,186 B2 | 4/2008 | Voorhees et al. |
| 7,377,935 B2 | 5/2008 | Schock et al. |
| 7,507,250 B2 | 3/2009 | Lennox |
| 7,517,360 B2 | 4/2009 | Frey et al. |
| RE40,815 E | 6/2009 | Kudaravalli et al. |
| 7,547,320 B2 | 6/2009 | Schook et al. |
| RE40,868 E | 8/2009 | Ryba et al. |
| 7,621,944 B2 | 11/2009 | Wilson et al. |
| 7,621,945 B2 | 11/2009 | Lennox et al. |
| 7,666,213 B2 | 2/2010 | Freedman, Jr. et al. |
| 7,678,716 B2 | 3/2010 | Yahiaoui et al. |
| 7,686,840 B2 | 3/2010 | Quincy, III et al. |
| 7,727,228 B2 | 6/2010 | Abboud et al. |
| 7,731,739 B2 | 6/2010 | Schock et al. |
| 7,744,640 B1 | 6/2010 | Faries, Jr. et al. |
| 7,749,261 B2 | 7/2010 | Hansen et al. |
| 7,763,061 B2 | 7/2010 | Schorr et al. |
| 7,771,461 B2 | 8/2010 | Schock et al. |
| 7,784,304 B2 | 8/2010 | Trinh et al. |
| 7,799,063 B2 | 9/2010 | Ingram et al. |
| 7,827,815 B2 | 11/2010 | Carson et al. |
| 7,867,266 B2 | 1/2011 | Collins |
| 7,892,269 B2 | 2/2011 | Collins et al. |
| 7,896,910 B2 | 3/2011 | Schirrmacher et al. |
| 7,918,243 B2 | 4/2011 | Diodati et al. |
| 8,047,010 B2 | 11/2011 | Carson et al. |
| 8,052,624 B2 | 11/2011 | Buchanan et al. |
| 8,066,752 B2 | 11/2011 | Hamilton et al. |
| 8,182,521 B2 | 5/2012 | Kane et al. |
| 8,187,697 B2 | 5/2012 | Quincy, III et al. |
| 8,216,163 B2 | 7/2012 | Edelman |
| 8,283,602 B2 | 10/2012 | Augustine et al. |
| 8,454,671 B2 | 6/2013 | Lennox et al. |
| D685,916 S | 7/2013 | Hoglund |
| 8,491,644 B1 | 7/2013 | Carson et al. |
| 8,597,217 B2 | 12/2013 | Lowe et al. |
| 8,597,339 B2 | 12/2013 | Augustine et al. |
| 8,603,150 B2 | 12/2013 | Kane et al. |
| 8,632,576 B2 | 1/2014 | Quisenberry |
| 8,647,374 B2 | 2/2014 | Koewler |
| 8,715,330 B2 | 5/2014 | Lowe et al. |
| 8,778,119 B2 | 7/2014 | Starr et al. |
| 8,808,344 B2 | 8/2014 | Scott et al. |
| 8,840,581 B2 | 9/2014 | McGill et al. |
| 9,034,458 B2 | 5/2015 | Li |
| 9,078,742 B2 | 7/2015 | Quincy, III et al. |
| 9,089,462 B1 | 7/2015 | Lafleche |
| 9,211,358 B2 | 12/2015 | Sinko et al. |
| 9,278,024 B2 | 3/2016 | Scott et al. |
| 9,333,112 B2 | 5/2016 | Carson |
| 9,552,706 B2 | 1/2017 | Schneider, II et al. |
| 9,566,185 B2 | 2/2017 | Carson et al. |
| 9,622,907 B2 | 4/2017 | Carson et al. |
| 9,687,386 B2 | 6/2017 | Carson |
| 9,763,823 B2 | 9/2017 | Voorhees et al. |
| 9,907,889 B2 | 3/2018 | Locke et al. |
| 10,010,452 B2 | 7/2018 | Wenske et al. |
| 10,123,902 B2 | 11/2018 | Carson et al. |
| 10,220,198 B2 | 3/2019 | Fuchs et al. |
| 10,258,501 B2 | 4/2019 | Carson |
| 10,376,412 B2 | 8/2019 | Brienza et al. |
| 10,441,458 B2 | 10/2019 | Voorhees et al. |
| 10,441,707 B2 | 10/2019 | Voorhees et al. |
| 10,548,778 B2 | 2/2020 | Hassenpflug et al. |
| D887,426 S | 6/2020 | Matsushita |
| 10,912,672 B1 | 2/2021 | Jones et al. |
| D922,424 S | 6/2021 | Frueh et al. |
| D925,574 S | 7/2021 | Beko |
| D928,188 S | 8/2021 | Giannino et al. |
| 11,173,071 B1 | 11/2021 | Tawil et al. |
| D939,550 S | 12/2021 | Miyai et al. |
| 11,234,859 B2 | 2/2022 | Voorhees et al. |
| D947,216 S | 3/2022 | Leininger |
| 11,285,039 B2 * | 3/2022 | Steele ............... B64G 1/50 |
| D948,534 S | 4/2022 | Bessette et al. |
| D952,666 S | 5/2022 | Sajan |
| D959,475 S | 8/2022 | Norman |
| D960,191 S | 8/2022 | Feit et al. |
| D973,067 S | 12/2022 | Oh et al. |
| 11,975,123 B2 | 5/2024 | Appel et al. |
| 2001/0034545 A1 | 10/2001 | Elkins |
| 2001/0039439 A1 | 11/2001 | Elkins et al. |
| 2002/0007203 A1 | 1/2002 | Gilmartin et al. |
| 2002/0015689 A1 | 2/2002 | Munro et al. |
| 2002/0107558 A1 | 8/2002 | Clifton et al. |
| 2002/0111657 A1 | 8/2002 | Dae et al. |
| 2002/0138121 A1 | 9/2002 | Fox |
| 2002/0161419 A1 | 10/2002 | Carson et al. |
| 2003/0074038 A1 | 4/2003 | Gruszecki et al. |
| 2003/0078638 A1 | 4/2003 | Voorhees et al. |
| 2003/0078639 A1 | 4/2003 | Carson |
| 2003/0078640 A1 | 4/2003 | Carson et al. |
| 2003/0109911 A1 | 6/2003 | Lachenbruch et al. |
| 2003/0114903 A1 | 6/2003 | Ellingboe |
| 2003/0135252 A1 | 7/2003 | MacHold et al. |
| 2003/0149359 A1 | 8/2003 | Smith |
| 2003/0149461 A1 | 8/2003 | Johnson |
| 2003/0150232 A1 | 8/2003 | Brudnicki |

(56) References Cited

U.S. PATENT DOCUMENTS

| | | |
|---|---|---|
| 2003/0163179 A1 | 8/2003 | Hoglund et al. |
| 2003/0163180 A1 | 8/2003 | Hoglund et al. |
| 2003/0163183 A1 | 8/2003 | Carson |
| 2003/0163185 A1 | 8/2003 | Carson |
| 2003/0212416 A1 | 11/2003 | Cinelli et al. |
| 2004/0030372 A1 | 2/2004 | Ellingboe et al. |
| 2004/0030373 A1 | 2/2004 | Ellingboe et al. |
| 2004/0059212 A1 | 3/2004 | Abreu |
| 2004/0064170 A1 | 4/2004 | Radons et al. |
| 2004/0073280 A1 | 4/2004 | Dae et al. |
| 2004/0082886 A1 | 4/2004 | Timpson |
| 2004/0087606 A1 | 5/2004 | Voorhees et al. |
| 2004/0133253 A1 | 7/2004 | Grahn et al. |
| 2004/0158303 A1* | 8/2004 | Lennox ............... A61F 7/0085 607/109 |
| 2004/0225341 A1 | 11/2004 | Schock et al. |
| 2004/0243122 A1 | 12/2004 | Auth et al. |
| 2004/0252750 A1 | 12/2004 | Gruszecki et al. |
| 2004/0255362 A1 | 12/2004 | Soerens et al. |
| 2004/0260369 A1 | 12/2004 | Schock et al. |
| 2004/0267339 A1 | 12/2004 | Yon et al. |
| 2005/0028551 A1 | 2/2005 | Noda et al. |
| 2005/0060012 A1 | 3/2005 | Voorhees et al. |
| 2005/0065583 A1 | 3/2005 | Voorhees et al. |
| 2005/0096714 A1 | 5/2005 | Freedman et al. |
| 2005/0177212 A1 | 8/2005 | Njemanze |
| 2005/0187502 A1 | 8/2005 | Krempel et al. |
| 2005/0244629 A1 | 11/2005 | Usui et al. |
| 2005/0288749 A1 | 12/2005 | Lachenbruch |
| 2006/0024053 A1 | 2/2006 | Grant |
| 2006/0030916 A1 | 2/2006 | Lennox |
| 2006/0036304 A1 | 2/2006 | Cordani et al. |
| 2006/0058858 A1 | 3/2006 | Smith |
| 2006/0074469 A1 | 4/2006 | Lennox et al. |
| 2006/0122673 A1 | 6/2006 | Callister et al. |
| 2006/0124141 A1 | 6/2006 | Dobak |
| 2006/0136023 A1 | 6/2006 | Dobak |
| 2006/0161232 A1 | 7/2006 | Kasza et al. |
| 2006/0190066 A1 | 8/2006 | Worthen |
| 2006/0235114 A1 | 10/2006 | Kitazono et al. |
| 2006/0247744 A1 | 11/2006 | Nest et al. |
| 2006/0276089 A1 | 12/2006 | Amarasinghe et al. |
| 2006/0287697 A1 | 12/2006 | Lennox |
| 2006/0293734 A1 | 12/2006 | Scott et al. |
| 2007/0043409 A1 | 2/2007 | Brian et al. |
| 2007/0049997 A1 | 3/2007 | Fields et al. |
| 2007/0054122 A1 | 3/2007 | Paisner et al. |
| 2007/0068931 A1 | 3/2007 | Augustine et al. |
| 2007/0073368 A1 | 3/2007 | Cazzini et al. |
| 2007/0100404 A1 | 5/2007 | Ko et al. |
| 2007/0173735 A1 | 7/2007 | Callister et al. |
| 2007/0213793 A1 | 9/2007 | Hayes |
| 2007/0225782 A1 | 9/2007 | Taylor |
| 2007/0244475 A1 | 10/2007 | Carson et al. |
| 2007/0270925 A1 | 11/2007 | Levinson |
| 2008/0027523 A1 | 1/2008 | Behringer et al. |
| 2008/0046046 A1 | 2/2008 | Ginsburg |
| 2008/0114431 A1 | 5/2008 | Ginsburg |
| 2008/0147152 A1 | 6/2008 | Quincy et al. |
| 2008/0249524 A1 | 10/2008 | Dunning |
| 2008/0255644 A1 | 10/2008 | Carson |
| 2008/0275534 A1 | 11/2008 | Noel |
| 2009/0018504 A1 | 1/2009 | Pile-Spellman et al. |
| 2009/0043366 A1 | 2/2009 | Dae |
| 2009/0066079 A1 | 3/2009 | Miros et al. |
| 2009/0088825 A1 | 4/2009 | Ota |
| 2009/0099629 A1 | 4/2009 | Carson et al. |
| 2009/0131835 A1 | 5/2009 | Voorhees et al. |
| 2009/0149925 A1 | 6/2009 | MacDonald et al. |
| 2009/0157000 A1 | 6/2009 | Waller |
| 2009/0177184 A1 | 7/2009 | Christensen et al. |
| 2009/0182400 A1 | 7/2009 | Dae et al. |
| 2009/0228082 A1 | 9/2009 | Ross, III et al. |
| 2009/0250367 A1 | 10/2009 | Murdoch et al. |
| 2009/0280182 A1 | 11/2009 | Beck et al. |
| 2009/0287283 A1 | 11/2009 | Biser et al. |
| 2009/0299287 A1 | 12/2009 | Carson et al. |
| 2009/0312823 A1 | 12/2009 | Patience et al. |
| 2009/0326619 A1 | 12/2009 | Kagan |
| 2010/0016933 A1 | 1/2010 | Chen et al. |
| 2010/0168825 A1 | 7/2010 | Barbknecht |
| 2010/0198122 A1 | 8/2010 | Freund |
| 2010/0198320 A1 | 8/2010 | Pierre et al. |
| 2010/0204765 A1 | 8/2010 | Hall et al. |
| 2010/0241073 A1 | 9/2010 | Andersen et al. |
| 2010/0312202 A1 | 12/2010 | Henley et al. |
| 2011/0021960 A1 | 1/2011 | Filtvedt et al. |
| 2011/0029051 A1 | 2/2011 | Ross |
| 2011/0045056 A1 | 2/2011 | Munro et al. |
| 2011/0125238 A1 | 5/2011 | Nofzinger |
| 2011/0152982 A1 | 6/2011 | Richardson |
| 2011/0166633 A1 | 7/2011 | Stull |
| 2011/0172749 A1 | 7/2011 | Christensen et al. |
| 2011/0306972 A1 | 12/2011 | Widenhouse et al. |
| 2011/0307040 A1 | 12/2011 | Peterson |
| 2011/0308781 A1 | 12/2011 | O'Riordan et al. |
| 2011/0313497 A1 | 12/2011 | McFarlane |
| 2012/0046720 A1 | 2/2012 | Ishizaki |
| 2012/0065715 A1 | 3/2012 | Carson |
| 2012/0080031 A1 | 4/2012 | Belson |
| 2012/0095536 A1 | 4/2012 | Machold et al. |
| 2012/0172774 A1 | 7/2012 | Lowe et al. |
| 2012/0185021 A1 | 7/2012 | Johnson et al. |
| 2012/0191035 A1 | 7/2012 | Stephan |
| 2012/0204881 A1 | 8/2012 | Davidson et al. |
| 2012/0220960 A1 | 8/2012 | Ruland |
| 2012/0288848 A1 | 11/2012 | Latham et al. |
| 2013/0023808 A1 | 1/2013 | Brown et al. |
| 2013/0116760 A1 | 5/2013 | Carson et al. |
| 2013/0138185 A1 | 5/2013 | Paxman et al. |
| 2013/0190667 A1 | 7/2013 | Kane et al. |
| 2013/0238042 A1 | 9/2013 | Gildersleeve et al. |
| 2013/0310725 A1 | 11/2013 | Jerrells et al. |
| 2014/0039451 A1 | 2/2014 | Bangera et al. |
| 2014/0046411 A1 | 2/2014 | Elkins et al. |
| 2014/0172050 A1 | 6/2014 | Dabrowiak |
| 2014/0214138 A1 | 7/2014 | Voorhees et al. |
| 2014/0222121 A1 | 8/2014 | Spence et al. |
| 2014/0228717 A1 | 8/2014 | Parish et al. |
| 2014/0228918 A1 | 8/2014 | Brienza et al. |
| 2014/0276253 A1 | 9/2014 | Varga et al. |
| 2014/0277301 A1 | 9/2014 | Varga et al. |
| 2014/0288621 A1 | 9/2014 | Efremkin |
| 2014/0316494 A1 | 10/2014 | Augustine et al. |
| 2014/0343639 A1 | 11/2014 | Hopper et al. |
| 2015/0025606 A1 | 1/2015 | Davis |
| 2015/0051673 A1 | 2/2015 | Rivas Tapia |
| 2015/0173942 A1 | 6/2015 | Whitely |
| 2015/0209192 A1 | 7/2015 | Manion et al. |
| 2015/0223972 A1 | 8/2015 | Dabrowiak |
| 2015/0230973 A1 | 8/2015 | Dabrowiak et al. |
| 2015/0250643 A1 | 9/2015 | Paradis |
| 2015/0290042 A1 | 10/2015 | Freer et al. |
| 2015/0366703 A1 | 12/2015 | Du |
| 2015/0373781 A1 | 12/2015 | Augustine et al. |
| 2016/0008166 A1 | 1/2016 | Voorhees et al. |
| 2016/0022477 A1 | 1/2016 | Schaefer et al. |
| 2016/0038336 A1 | 2/2016 | Hilton et al. |
| 2016/0310316 A1 | 10/2016 | Hixson, Jr. |
| 2016/0324683 A1 | 11/2016 | Carson |
| 2017/0049618 A1 | 2/2017 | Ward et al. |
| 2017/0135855 A1 | 5/2017 | Stefan et al. |
| 2017/0151087 A1 | 6/2017 | Carson et al. |
| 2017/0189225 A1 | 7/2017 | Voorhees et al. |
| 2017/0224528 A1 | 8/2017 | Berg et al. |
| 2017/0246029 A1 | 8/2017 | Clark |
| 2017/0246031 A1 | 8/2017 | Benyaminpour et al. |
| 2017/0246374 A1 | 8/2017 | Voorhees et al. |
| 2017/0348144 A1 | 12/2017 | Taylor et al. |
| 2017/0348145 A1 | 12/2017 | Voorhees et al. |
| 2017/0354534 A1 | 12/2017 | Paradis et al. |
| 2018/0000255 A1 | 1/2018 | Youngblood et al. |
| 2018/0014967 A1 | 1/2018 | Taylor |
| 2018/0042762 A1 | 2/2018 | Galer |

(56) References Cited

U.S. PATENT DOCUMENTS

| | | |
|---|---|---|
| 2018/0042763 A1 | 2/2018 | Galer et al. |
| 2018/0064594 A1 | 3/2018 | Finch, Jr. et al. |
| 2018/0207024 A1 | 7/2018 | Dabrowiak et al. |
| 2018/0214297 A1 | 8/2018 | Hughett et al. |
| 2018/0214302 A1 | 8/2018 | Dabrowiak et al. |
| 2018/0263677 A1 | 9/2018 | Hilton et al. |
| 2018/0376539 A1 | 12/2018 | Augustine et al. |
| 2019/0083322 A1 | 3/2019 | Huang et al. |
| 2019/0085644 A1 | 3/2019 | Ames et al. |
| 2019/0099288 A1 | 4/2019 | Vergara et al. |
| 2019/0117446 A1 | 4/2019 | Carson et al. |
| 2019/0192337 A1 | 6/2019 | Taylor et al. |
| 2019/0201574 A1 | 7/2019 | Delury et al. |
| 2019/0262169 A1 | 8/2019 | Vergara et al. |
| 2019/0331277 A1 | 10/2019 | Vachon |
| 2020/0001022 A1 | 1/2020 | Landy, III et al. |
| 2020/0071051 A1 | 3/2020 | Lewis |
| 2020/0155341 A1 | 5/2020 | Voorhees et al. |
| 2020/0246180 A1 | 8/2020 | Liang et al. |
| 2020/0345971 A1 | 11/2020 | Schirm et al. |
| 2020/0405530 A1 | 12/2020 | Taylor et al. |
| 2021/0060230 A1 | 3/2021 | Hopper et al. |
| 2022/0087874 A1 | 3/2022 | Schneider et al. |
| 2022/0151821 A1 | 5/2022 | Voorhees et al. |
| 2022/0192865 A1 | 6/2022 | Hughett, Sr. et al. |
| 2022/0192867 A1 | 6/2022 | Stich et al. |
| 2022/0233344 A1 | 7/2022 | Hoglund |
| 2022/0233347 A1 | 7/2022 | Canary et al. |
| 2022/0280336 A1 | 9/2022 | Smith et al. |
| 2022/0287875 A1 | 9/2022 | Minchew et al. |
| 2022/0287876 A1 | 9/2022 | Smith et al. |
| 2022/0296413 A1 | 9/2022 | Jones |
| 2022/0296414 A1 | 9/2022 | Bible et al. |
| 2022/0304847 A1 | 9/2022 | Kuroda et al. |
| 2022/0313478 A1 | 10/2022 | Johnston et al. |
| 2022/0347009 A1 | 11/2022 | Hughett, Sr. et al. |
| 2022/0401259 A1 | 12/2022 | Basciano et al. |
| 2022/0406017 A1 | 12/2022 | Wang et al. |
| 2023/0000668 A1 | 1/2023 | Walker et al. |
| 2023/0009524 A1 | 1/2023 | Johnston et al. |
| 2023/0011631 A1 | 1/2023 | Yin et al. |
| 2023/0019048 A1 | 1/2023 | Stich et al. |
| 2023/0021245 A1 | 1/2023 | Walker et al. |
| 2023/0040583 A1 | 2/2023 | Falis et al. |
| 2023/0077318 A9 | 3/2023 | Voorhees et al. |
| 2023/0190519 A1 | 6/2023 | Stich et al. |
| 2024/0065884 A1 | 2/2024 | Fallows et al. |
| 2024/0082052 A1 | 3/2024 | Cho et al. |
| 2024/0091054 A1 | 3/2024 | Boone-Worthman et al. |
| 2024/0099878 A1 | 3/2024 | Voorhees et al. |
| 2024/0108497 A1 | 4/2024 | Daw et al. |
| 2024/0366422 A1 | 11/2024 | Johnston et al. |
| 2025/0032310 A1 | 1/2025 | Stich et al. |
| 2025/0041107 A1 | 2/2025 | Walker et al. |
| 2025/0110628 A1 | 4/2025 | Litman et al. |
| 2025/0134705 A1 | 5/2025 | Stich et al. |
| 2025/0143918 A1 | 5/2025 | Voorhees et al. |
| 2025/0161107 A1 | 5/2025 | Stich et al. |
| 2025/0198550 A1 | 6/2025 | Johnston et al. |

FOREIGN PATENT DOCUMENTS

| | | |
|---|---|---|
| CA | 2729122 A1 | 7/2002 |
| CN | 102026596 A | 4/2011 |
| CN | 101389372 B | 8/2012 |
| CN | 102746518 A | 10/2012 |
| CN | 103939695 B | 3/2016 |
| CN | 305928532 | 7/2020 |
| CN | 111643265 A | 9/2020 |
| CN | 306402573 | 3/2021 |
| CN | 113230017 A | 8/2021 |
| CN | 307690236 | 11/2022 |
| CN | 309180016 | 3/2025 |
| DE | 102014118510 A1 | 6/2016 |
| EP | 0862901 A1 | 9/1998 |
| EP | 1073388 A1 | 2/2001 |
| EP | 1616543 A2 | 1/2006 |
| EP | 1641503 A2 | 4/2006 |
| EP | 1718894 B1 | 7/2010 |
| EP | 2204150 A1 | 7/2010 |
| EP | 2269546 A1 | 1/2011 |
| GB | 2118440 A | 11/1983 |
| JP | H09508045 A | 8/1997 |
| JP | 2002-534160 A | 10/2002 |
| JP | 2007029638 A | 2/2007 |
| JP | 2013248293 A | 12/2013 |
| KR | 20110020420 A | 3/2011 |
| WO | 9807397 A1 | 2/1998 |
| WO | 98/31310 A1 | 7/1998 |
| WO | 199944552 A1 | 9/1999 |
| WO | 9953874 A1 | 10/1999 |
| WO | 2000040185 A1 | 7/2000 |
| WO | 2003086253 A2 | 10/2003 |
| WO | 2004075949 A2 | 9/2004 |
| WO | 2005028984 A1 | 3/2005 |
| WO | 2005117546 A2 | 12/2005 |
| WO | 2007120677 A2 | 10/2007 |
| WO | 2009/090403 A1 | 7/2009 |
| WO | 2009147413 A1 | 12/2009 |
| WO | 2009148636 A1 | 12/2009 |
| WO | 2012125916 A2 | 9/2012 |
| WO | 2012138980 A2 | 10/2012 |
| WO | 2015084925 A1 | 6/2015 |
| WO | 2016057119 A1 | 4/2016 |
| WO | 2016123500 A1 | 8/2016 |
| WO | 2017/127768 A1 | 7/2017 |
| WO | 2018075576 A1 | 4/2018 |
| WO | 2022/159879 A1 | 7/2022 |
| WO | 2022155130 A1 | 7/2022 |
| WO | 2022155132 A1 | 7/2022 |
| WO | 2022159513 A1 | 7/2022 |
| WO | 2022/165068 A1 | 8/2022 |
| WO | 2022235513 A1 | 11/2022 |
| WO | 2023121674 A1 | 6/2023 |
| WO | 2023140870 A1 | 7/2023 |
| WO | 2023154050 A1 | 8/2023 |
| WO | 2023229609 A1 | 11/2023 |

OTHER PUBLICATIONS

PCT/US2016/015688 filed Jan. 29, 2016 International Search Report and Written Opinion dated Apr. 1, 2016.
PCT/US2022/013672 filed Jan. 25, 2022, International Search Report and Written Opinion dated Jul. 15, 2022.
PCT/US2022/014147 filed Jan. 27, 2022 International Search Report and Written Opinion dated Jul. 18, 2022.
Sevgi, M., et. al. "Topical Antimicrobials for Burn Infections—An Update" Recent Pat Antiinfect Drug Discov. Dec. 2013 ; 8(3): 161-197.
Stoica, A. E., et al. "Hydrogel Dressings for the Treatment of Burn Wounds: An Up-To-Date Overview" Materials 2020, 13, 2853; doi:10.3390/ma13122853. (2020).
PCT/US2021/065144 filed Dec. 23, 2021 International Search Report dated Oct. 4, 2022.
PCT/US2022/026999 filed Apr. 29, 2022 International Search Report and Written Opinion dated Oct. 24, 2022.
U.S. Appl. No. 17/848,074, filed Jun. 23, 2022 Advisory Action dated Jul. 9, 2024.
U.S. Appl. No. 17/848,074, filed Jun. 23, 2022 Final Office Action dated Apr. 26, 2024.
U.S. Appl. No. 17/848,074, filed Jun. 23, 2022 Non-Final Office Action dated Nov. 30, 2023.
U.S. Appl. No. 18/536,087, filed Dec. 11, 2023 Non-Final Office Action dated Jun. 28, 2024.
U.S. Appl. No. 17/589,849, filed Jan. 31, 2022 Non-Final Office Action dated Apr. 12, 2023.
PCT/US2022/013569 filed Jan. 24, 2022 International Search Report and Written Opinion dated Aug. 29, 2022.
PCT/US2022/016020 filed Feb. 10, 2022 International Search Report and Written Opinion dated Oct. 31, 2022.

(56) References Cited

OTHER PUBLICATIONS

U.S. Appl. No. 17/547,128, filed Dec. 9, 2021 Restriction Requirement dated Sep. 5, 2024.
U.S. Appl. No. 17/583,090, filed Jan. 24, 2022 Restriction Requirement dated Sep. 6, 2024.
U.S. Appl. No. 17/686,301, filed Mar. 3, 2022 Non-Final Office Action dated Oct. 1, 2024.
U.S. Appl. No. 17/689,791, filed Mar. 8, 2022 Restriction Requirement dated Oct. 16, 2024.
U.S. Appl. No. 17/691,990, filed Mar. 10, 2022 Restriction Requirement dated Oct. 16, 2024.
U.S. Appl. No. 17/709,019, filed Mar. 30, 2022 Restriction Requirement dated Oct. 16, 2024.
U.S. Appl. No. 17/723,210, filed Apr. 18, 2022 Restriction Requirement dated Oct. 16, 2024.
U.S. Appl. No. 17/848,074, filed Jun. 23, 2022 Non-Final Office Action dated Aug. 15, 2024.
U.S. Appl. No. 18/536,087, filed Dec. 11, 2023 Notice of Allowance dated Aug. 29, 2024.
PCT/US2022/011980 filed Jan. 11, 2022 International Search Report and Written Opinion dated Apr. 13, 2022.
PCT/US2022/013007 filed Jan. 19, 2022 International Search Report and Written Opinion dated Apr. 22, 2022.
PCTUS2022011971 filed Jan. 11, 2022 International Search Report and Written Opinion dated Apr. 21, 2022.
U.S. Appl. No. 17/589,849, filed Jan. 31, 2022 Final Office Action dated Jun. 27, 2023.
U.S. Appl. No. 17/589,849, filed Jan. 31, 2022 Notice of Allowance dated Aug. 23, 2023.
Advantage Engineering, "Proper Use of Inhibited Propylene Glycol", Jun. 12, 2001, http://www.ttequip.com/knowledgelibrary/Proper%20Use%20Of%20Inh-ibited%20Propylene%20Glycol.pdf Jun. 12, 2001.
Hyperphysicis, "Thermal Conductivity", available Jul. 31, 2010, https://web.archive.org/web/20100731025127/http://hyperphysics.phy-astr.g-us.edu/hbase/tables.thron.html Jul. 31, 2010.
PCT/US2015/045548 filed Aug. 17, 2015 International Search Report and Written Opinion dated Nov. 24, 2015.
U.S. Appl. No. 15/512,025, filed Mar. 16, 2017 Final Office Action dated Jun. 25, 2020.
U.S. Appl. No. 15/512,025, filed Mar. 16, 2017 Non-Final Office Action dated Jul. 18, 2019.
U.S. Appl. No. 16/597,393, filed Oct. 9, 2019 Corrected Notice of Allowability dated Nov. 18, 2021.
U.S. Appl. No. 16/597,393, filed Oct. 9, 2019 Non-Final Office Action dated Apr. 28, 2021.
All in 1: Injection Tracker, posted date unavailable [online], [retrieved Apr. 10, 2025]. Retrieved from internet, https://apps.apple.com/us/app/all-in-1-injection-tracker/id1667540577. (Year: 2025).
Creating an accessible, usable and compelling Injection Site Tracking feature that can used by all our users, posted date May 2020 [u online], [retrieved Apr. 10, 2025]. Retrieved from internet, https://www.bradstricker.com/case-studies/injection-site-tracking. (Year: 2020).
Injection Tracker App, posted date unavailable [online], [retrieved Apr. 10, 2025]. Retrieved from internet, https://www.vladcristei.com/project_page_it. (Year: 2025).
PCT/US2022/031428 filed May 27, 2022 International Search Report and Written Opinion dated Jan. 30, 2023.
U.S. Appl. No. 17/547,128, filed Dec. 9, 2021 Non-Final Office Action dated Feb. 10, 2025.
U.S. Appl. No. 17/552,309, filed Dec. 15, 2021 Non-Final Office Action dated Mar. 14, 2025.
U.S. Appl. No. 17/552,309, filed Dec. 15, 2021 Restriction Requirement dated Dec. 12, 2024.
U.S. Appl. No. 17/583,090, filed Jan. 24, 2022 Non-Final Office Action dated Feb. 13, 2025.
U.S. Appl. No. 17/584,101, filed Jan. 25, 2022 Non-Final Office Action dated Feb. 5, 2025.
U.S. Appl. No. 17/584,101, filed Jan. 25, 2022 Restriction Requirement dated Nov. 5, 2024.
U.S. Appl. No. 17/686,301, filed Mar. 3, 2022 Advisory Action dated Apr. 4, 2025.
U.S. Appl. No. 17/686,301, filed Mar. 3, 2022 Final Office Action dated Jan. 29, 2025.
U.S. Appl. No. 17/689,791, filed Mar. 8, 2022 Non-Final Office Action dated Dec. 30, 2024.
U.S. Appl. No. 17/690,908, filed Mar. 9, 2022 Non-Final Office Action dated Dec. 18, 2024.
U.S. Appl. No. 17/691,990, filed Mar. 10, 2022 Non-Final Office Action dated Dec. 17, 2024.
U.S. Appl. No. 17/694,416, filed Mar. 14, 2022 Non-Final Office Action dated Jan. 22, 2025.
U.S. Appl. No. 17/694,416, filed Mar. 14, 2022 Restriction Requirement dated Nov. 8, 2024.
U.S. Appl. No. 17/700,216, filed Mar. 21, 2022 Non-Final Office Action dated Feb. 5, 2025.
U.S. Appl. No. 17/709,019, filed Mar. 30, 2022 Non-Final Office Action dated Dec. 31, 2024.
U.S. Appl. No. 17/723,210, filed Apr. 18, 2022 Non-Final Office Action dated Dec. 20, 2024.
U.S. Appl. No. 17/848,074, filed Jun. 23, 2022 Notice of Allowance dated Nov. 26, 2024.
U.S. Appl. No. 17/849,419, filed Jun. 24, 2022 Final Office Action dated Feb. 14, 2025.
U.S. Appl. No. 17/849,419, filed Jun. 24, 2022 Non-Final Office Action dated Nov. 8, 2024.
U.S. Appl. No. 17/857,997, filed Jul. 5, 2022 Non-Final Office Action dated Apr. 28, 2025.
U.S. Appl. No. 17/857,997, filed Jul. 5, 2022 Restriction Requirement dated Feb. 12, 2025.
U.S. Appl. No. 17/859,995, filed Jul. 7, 2022 Non-Final Office Action dated Mar. 11, 2025.
U.S. Appl. No. 17/881,270, filed Aug. 4, 2022 Non-Final Office Action dated Apr. 28, 2025.
U.S. Appl. No. 17/881,270, filed Aug. 4, 2022 Restriction Requirement dated Feb. 11, 2025.
U.S. Appl. No. 29/939,277, filed Apr. 25, 2024 Non-Final Office Action dated May 13, 2025.
Wound care app can help determine appropriate wounddressings, posted date Apr. 24, 2013 [online], [retrieved Apr. 10, 2025]. Retrieved from internet, https://www.imedicalapps.com/2013/04/wound-care-app-dressings/. (Year: 2013).
U.S. Appl. No. 17/552,309, filed Dec. 15, 2021 Final Office Action dated Jul. 30, 2025.
U.S. Appl. No. 17/583,090, filed Jan. 24, 2022 Final Office Action dated Jul. 1, 2025.
U.S. Appl. No. 17/686,301, filed Mar. 3, 2022 Non-Final Office Action dated May 14, 2025.
U.S. Appl. No. 17/689,791, filed Mar. 8, 2022 Advisory Action dated Jul. 24, 2025.
U.S. Appl. No. 17/689,791, filed Mar. 8, 2022 Final Office Action dated May 21, 2025.
U.S. Appl. No. 17/690,908, filed Mar. 9, 2022 Final Office Action dated Jun. 24, 2025.
U.S. Appl. No. 17/691,990, filed Mar. 10, 2022 Advisory Action dated Jul. 24, 2025.
U.S. Appl. No. 17/694,416, filed Mar. 14, 2022 Final Office Action dated Jun. 20, 2025.
U.S. Appl. No. 17/700,216, filed Mar. 21, 2022 Final Office Action dated Jun. 23, 2025.
U.S. Appl. No. 17/709,019, filed Mar. 30, 2022 Advisory Action dated Jul. 24, 2025.
U.S. Appl. No. 17/709,019, filed Mar. 30, 2022 Final Office Action dated Jun. 15, 2025.
U.S. Appl. No. 17/723,210, filed Apr. 18, 2022 Advisory Action dated Jul. 31, 2025.
U.S. Appl. No. 17/723,210, filed Apr. 18, 2022 Final Office Action dated May 21, 2025.
U.S. Appl. No. 17/848,039, filed Jun. 23, 2021 Non-Final Office Action dated Jul. 29, 2025.
U.S. Appl. No. 17/849,419, filed Jun. 24, 2022 Non-Final Office Action dated Jun. 13, 2025.

(56) References Cited

OTHER PUBLICATIONS

U.S. Appl. No. 18/085,566, filed Dec. 20, 2022 Restriction Requirement dated May 16, 2025.
U.S. Appl. No. 18/272,026, filed Jul. 12, 2023 Non-Final Office Action dated Jul. 31, 2025.

* cited by examiner

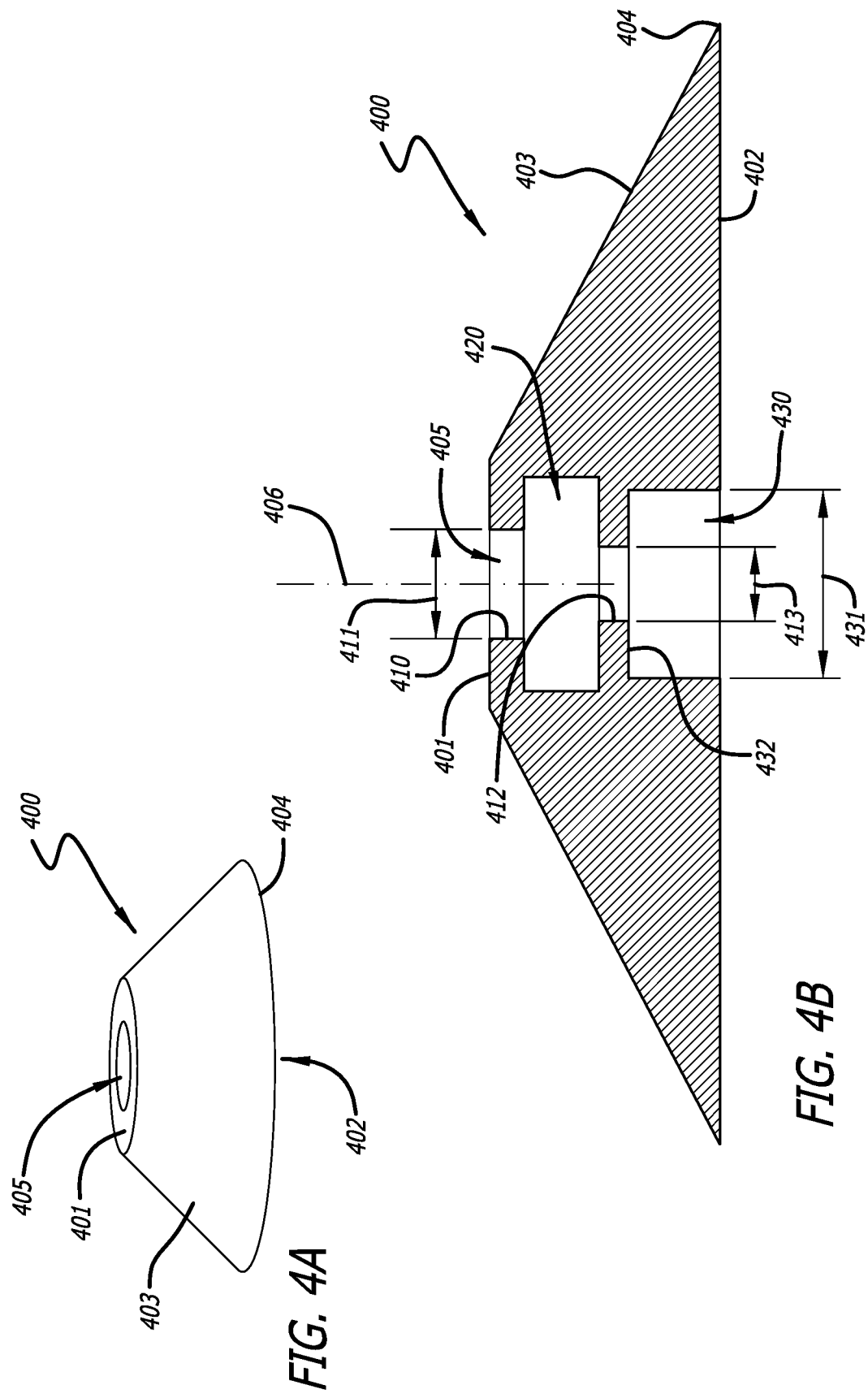

GEL PAD ASSEMBLY USING FREE ROTATABLE FLUID JOINTS

PRIORITY

This application claims the benefit of priority to U.S. Provisional Application No. 63/152,733, filed Feb. 23, 2021, which is incorporated by reference in its entirety into this application.

BACKGROUND

The effect of temperature on the human body has been well documented and the use of targeted temperature management (TTM) systems for selectively cooling and/or heating bodily tissue is known. Elevated temperatures, or hyperthermia, may be harmful to the brain under normal conditions, and even more importantly, during periods of physical stress, such as illness or surgery. Conversely, lower body temperatures, or mild hypothermia, may offer some degree of neuroprotection. Moderate to severe hypothermia tends to be more detrimental to the body, particularly the cardiovascular system.

Targeted temperature management can be viewed in two different aspects. The first aspect of temperature management includes treating abnormal body temperatures, i.e., cooling the body under conditions of hyperthermia or warming the body under conditions of hypothermia. The second aspect of thermoregulation is an evolving treatment that employs techniques that physically control a patient's temperature to provide a physiological benefit, such as cooling a stroke patient to gain some degree of neuroprotection. By way of example, TTM systems may be utilized in early stroke therapy to reduce neurological damage incurred by stroke and head trauma patients. Additional applications include selective patient heating/cooling during surgical procedures such as cardiopulmonary bypass operations.

TTM systems circulate a fluid (e.g., water) through one or more thermal contact pads coupled with a patient to affect surface-to-surface thermal energy exchange with the patient. In general, TTM systems comprise a TTM fluid control module coupled with at least one contact pad via a fluid deliver line. One such TTM system is disclosed in U.S. Pat. No. 6,645,232, titled, "Patient Temperature Control System with Fluid Pressure Maintenance," and one such thermal contact pad and related system is disclosed in U.S. Pat. No. 6,197,045 (the '045 patent), titled, "Cooling/heating Pad and System," both of which are incorporated herein by reference in their entireties. As noted in the '045 patent, the ability to establish and maintain thermally intimate pad-to-patient contact is of importance to fully realizing medical efficacies with TTM systems. In some instances, the location and/or orientation of the pad may need to be adjusted to maximize thermal energy exchange with the patient.

The pad is generally coupled with the TTM control module via the fluid delivery line where the fluid delivery to be attached to the pad in a fixed orientation. In some instances, the fixed orientation may make it difficult for the clinician to apply the pad to the patient in the desired position and/or orientation with the fluid delivery line extending away from the pad in a fixed direction. As such, it would be advantageous for the clinician to rotate the fluid delivery line with respect to the pad when initially applying the pad to the patient and/or when adjusting the position of the pad after initial application. Disclosed herein are embodiments of devices and methods for adjusting an orientation of the fluid delivery line with respect to the thermal contact pad when performing the TTM therapy.

SUMMARY OF THE INVENTION

Briefly summarized, disclosed herein is a medical pad for exchanging thermal energy between a targeted temperature management (TTM) fluid and a patient. The pad includes a fluid containing layer having a top side and a bottom side, where the fluid containing layer is configured for containing the TTM fluid. The fluid containing also includes a fluid inlet and a fluid outlet, and the TTM fluid is circulatable within the fluid containing layer from the fluid inlet to the fluid outlet. A fluid conduit is attached to one of the fluid inlet or the fluid outlet via a rotatable joint, where the joint is configured to facilitate rotation of the fluid conduit with respect to the pad. The joint includes a lumen extending through the joint, where the lumen establishes fluid communication between the fluid conduit and the fluid containing layer.

In some embodiments, the joint includes a first joint member attached to the fluid conduit and a second joint member attached to the fluid containing layer, and the first joint member is rotatable with respect to the second joint member. The first joint member may include an elbow configured to establish parallel orientation of a distal portion of the fluid conduit with respect to the pad. The second joint member may be attached to an outside surface of the fluid containing layer.

In some embodiments, a portion of one of the first joint member or the second joint member is disposed with an opening of the other one of the first joint member or the second joint member, and in further embodiments, the joint includes a sealing member disposed between the first joint member and the second joint member. The sealing member is configured to define a dynamic fluid seal between the first joint member and the second joint member. One of the first joint member or the second joint member may include an annular groove containing the sealing member, and the other one of the first joint member or the second joint member may include annular sealing surface disposed in interfering contact with the sealing member. During rotation of the first joint member with respect to the second joint member, the annular sealing surface may be displaced with respect to the sealing member, and the joint may include a lubricant disposed between the annular sealing surface and the sealing member. During assembly of the first joint member with the second member, the annular sealing surface may be longitudinally displaced with respect to the sealing member.

The sealing member may be formed of a toroidal shape and in some embodiments, the sealing member is an O-ring (e.g., a packing or toric joint, which may comprise a mechanical gasket formed of, for example, elastomer). In some embodiments, the joint includes more than one sealing member.

The first joint member is configured to couple with the second joint member via a snap-fit retention mechanism and the retention mechanism may include at least one deflectable member. The retention mechanism may be disposed within the opening, and the second joint member may include the opening.

In some embodiments, the opening includes a first inside annular surface having a first diameter, the first joint member includes a first outside annular surface, and the first outside annular surface is disposed in sliding engagement with the first inside annular surface. In further embodiments, the opening includes a second inside annular surface having a second diameter, the first joint member includes a second outside annular surface, and the second outside annular surface is disposed in sliding engagement with the second inside annular surface. The first inside annular surface may be disposed adjacent a top side of the second joint member, and the second diameter may be less than the first diameter. The opening may also include a recess extending upward from a bottom side of the second joint member, where the recess defines a third diameter, and the third diameter may be greater than the second diameter.

The first joint member may include the deflectable member of the retention mechanism and the deflectable member may be biased radially outward from the lumen. When the first joint member is coupled with the second joint member, at least a portion of the deflectable member may be disposed within the recess.

The joint may be configured to facilitate assembly of the first joint member with the second member via longitudinal displacement of the first joint member with respect to the second joint member. The deflectable member may include an angled surface configured to engage the second annular surface during assembly of the first joint member with the second joint member, and during assembly, engagement of the angled surface may cause the deflectable member to deflect radially inward toward the lumen. In some embodiments, the retention mechanism includes more than one deflectable member.

The pad may include an insulation layer disposed on the top side of the fluid containing layer, and the joint may be disposed through an opening in the insulation layer. In some embodiments, at least a portion of the second joint member is disposed between the insulation layer and the fluid containing layer.

Also disclosed herein is a method of manufacturing a thermal pad for providing thermal energy exchange with a patient. The method includes providing a fluid containing layer having top side and a bottom side. The fluid containing layer is configured for containing the TTM fluid. The fluid containing layer also includes a fluid inlet and a fluid outlet, and the TTM fluid is circulatable within the fluid containing layer from the fluid inlet to the fluid outlet. Also provided is a first member of a rotatable joint and a second member of the rotatable joint.

The method further includes coupling the first member to a fluid delivery line, coupling the second member to the fluid containing layer, and inserting the first member within an opening of the second member, where inserting the first member within an opening of the second member facilitates a snap-fit retention mechanism between the first member and the second member, and the retention mechanism prevents separation of the second member from the first member.

The method of manufacturing may further include placing a sealing member within a groove of one of the first member or the second member.

In some embodiments of the method of manufacturing, one of the first member or the second member includes a deflectable member of the retention mechanism, where the deflectable member includes an angled surface, and the other one of the first member or the second member includes a contact surface so that during insertion, the angled surface engages the contact surface to urge the deflectable member away from the contact surface.

In some embodiments, at least one of the steps of coupling the first member to a fluid delivery line or coupling the second member to the fluid containing layer is performed at a first facility, and the step of inserting the first member within an opening of the second member is performed at a second facility. The first facility may be a manufacturing facility and the second facility may be a patient care facility.

Also disclosed herein is a method of using a thermal pad assembly configured for providing thermal energy exchange with a patient. The method includes providing a thermal pad assembly including a thermal pad and a fluid delivery line coupled with the thermal pad. The method further includes rotating the fluid delivery line relative to the thermal pad via a rotatable joint disposed between the fluid delivery line and the thermal pad to establish a first orientation of the fluid delivery line relative to the thermal pad. The method further includes applying the thermal pad to the patient at a first angular orientation of the thermal pad, and coupling the fluid delivery line with a targeted temperature management module.

The method may further include adjusting the angular orientation of the thermal pad away from the first angular orientation toward a second angular orientation and the rotating the fluid delivery line relative to the thermal pad away from the first orientation toward a second orientation of the fluid delivery line relative to the thermal pad.

These and other features of the concepts provided herein will become more apparent to those of skill in the art in view of the accompanying drawings and the following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 4A is a front perspective view of a pad member of the rotatable joint of FIGS. 1 and 2, in accordance with some embodiments.

FIG. 4B is a cross-sectional view of the pad member of FIG. 4A, in accordance with some embodiments.

DETAILED DESCRIPTION

Figure 1:
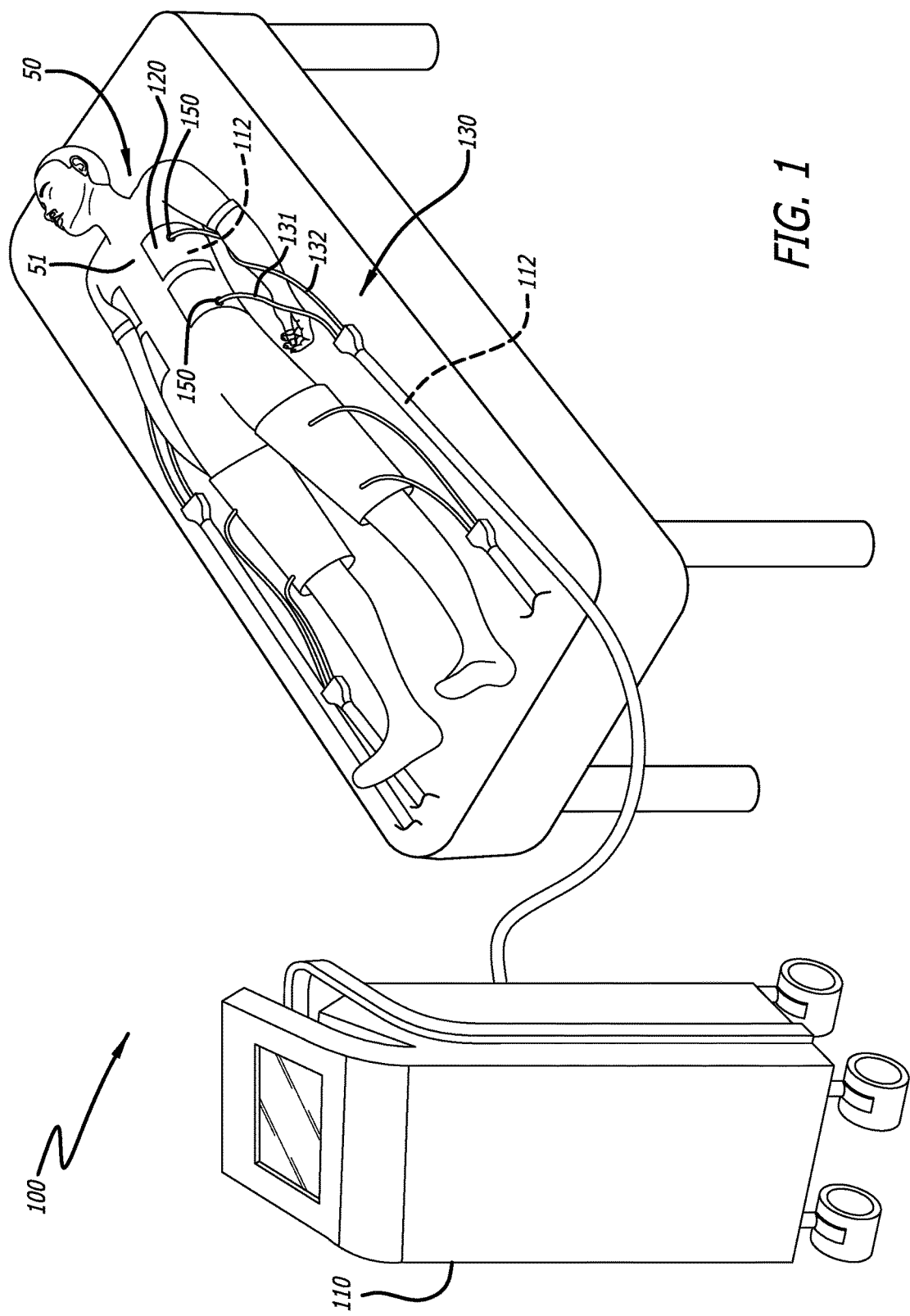
FIG. 1 illustrates a targeted temperature management (TTM) system for cooling or warming a patient, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," "horizontal," "vertical" and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. The words "including," "has," and "having," as used herein, including the claims, shall have the same meaning as the word "comprising." Furthermore, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

The phrases "connected to" and "coupled with" refer to any form of interaction between two or more entities, including mechanical, electrical, magnetic, electromagnetic, fluid, signal, communicative (including wireless), and thermal interaction. Two components may be connected to or coupled with each other even though they are not in direct contact with each other. For example, two components may be coupled with each other through an intermediate component.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Unless defined otherwise, all technical and scientific terms used herein have the same meaning as commonly understood by those of ordinary skill in the art.

FIG. 1 illustrates a targeted temperature management (TTM) system 100 connected to a patient 50 for administering targeted temperature management therapy to the patient 50 which may include a cooling and/or warming of the patient 50, in accordance with some embodiments. The TTM system 100 includes a TTM module 110 and a thermal contact pad (pad) 120. A fluid delivery line (FDL) 130 coupled with the thermal contact pad 120 extends between the TTM module 110 and the pad 120 to provide of flow of TTM fluid 112 between the TTM module 110 and the pad 120. The FDL includes two fluid conduits to facilitate delivery and return flow of TTM fluid 112 between the TTM module 110 and the pad 120 as further described below.

The TTM system 100 may include 1, 2, 3, 4 or more pads 120 and the TTM system 100 may include 1, 2, 3, 4 or more fluid delivery lines 130. In use, the TTM module 110 prepares the TTM fluid 112 for delivery to the pad 120 by heating or cooling the TTM fluid 112 to a defined temperature in accordance with a prescribed TTM therapy. The TTM module 110 circulates the TTM fluid 112 along a TTM fluid flow path including within the pad 120. The pad 120 is applied to the skin 51 of the patient to facilitate thermal energy exchange between the pad 120 and the patient 50. During the TTM therapy, the TTM module 110 may continually control the temperature of the TTM fluid 112 toward a target TTM temperature.

The FDL 130 includes at least a fluid delivery conduit 131 and a fluid return conduit 132. In use, the TTM fluid 112 may flow from the TTM module 110 through the fluid delivery conduit 131 to the pad 120. The TTM fluid 112 may then flow from thermal pad 120 through the fluid return conduit 132 to the TTM module 110. In some embodiments, the fluid delivery conduit 131 and the fluid return conduit 132 may be attached together along a portion of a length of the FDL 130. The fluid delivery conduit 131 and the fluid return conduit 132 may be separated from each other at each end of the FDL 130.

The FDL 130 is coupled with thermal pad 120 via one or more rotatable joints 150. More specifically each of the fluid delivery conduit 131 and a fluid return conduit 132 is coupled with the thermal pad 120 via a rotatable joint 150.

Figure 2:
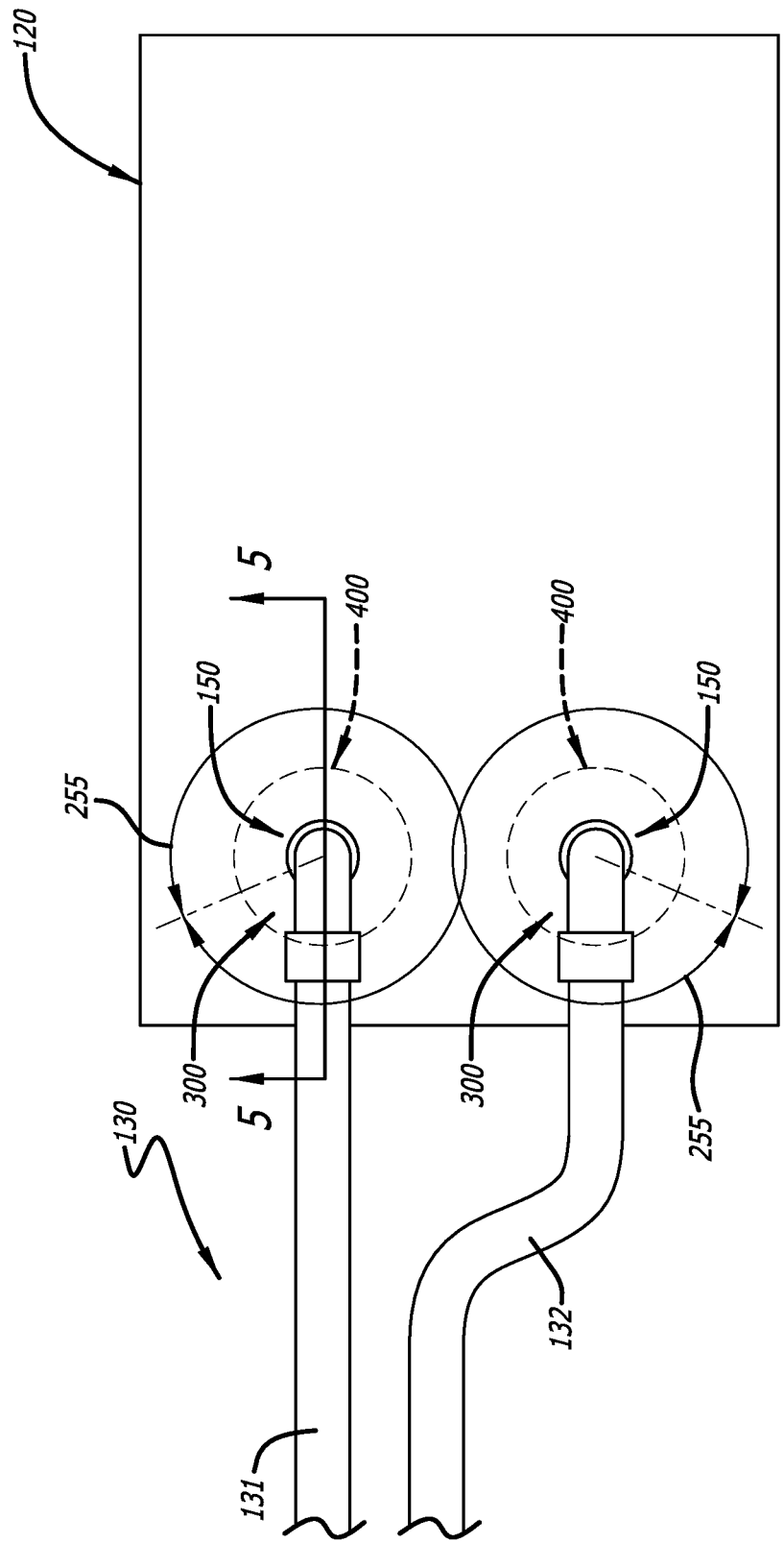
FIG. 2 is a top view of the thermal contact pad of FIG. 1, in accordance with some embodiments.

FIG. 2 shows a top view of the pad 120 in accordance with some embodiments. In the illustrated embodiment, the pad 120 includes two rotatable joints 150 coupled between the FDL 130 and the pad 120. As illustrated, the rotatable joints 150 may provide for a rotatable connection between the FDL 130 and the pad 120. The rotatable connection may provide for the FDL 130, or more specifically each of the fluid delivery conduit 131 and the fluid return conduit 132, to rotate. In the illustrated embodiment, each rotatable joint 150 facilitates rotation of each of the fluid delivery conduit 131 and a fluid return conduit 132 through an angle 255 that is unlimited. In other embodiments, the rotatable joint 150 may limit rotation of the FDL 130 to about 90 degrees, 180 degrees, 270, or 360 degrees.

FIGS. 3A-5 illustrate components and functionality of the joint 150. In the illustrated embodiment of FIG. 2, the thermal pad 120 includes two rotatable joints 150 coupled generally to the FDL 130, and more specifically, each of the two rotatable joints 150 are individually coupled with one of the fluid delivery conduit 131 and the fluid return conduit 132. In other embodiments, the pad 120 may include more than two rotatable joints 150 couple to additional fluid conduits. While FIGS. 3-5 and the corresponding description that follows, show and describe the components and functionality of a single joint 150 of FIG. 2, the FIGS. 3-5 and the corresponding description may apply equally well to other and/or all rotatable joints 150.

Figures 3A, 3B:
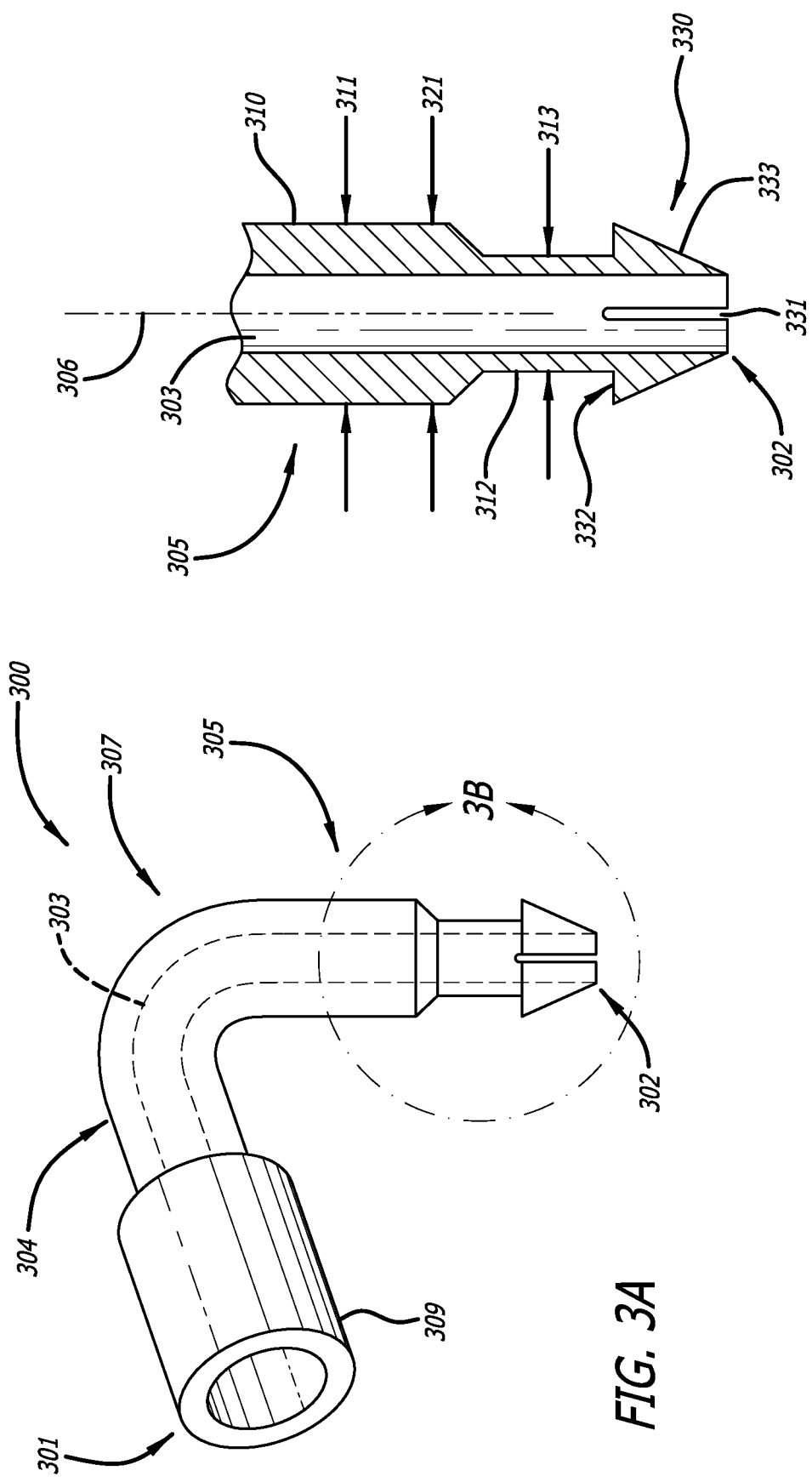
FIG. 3A is a front perspective view of a fluid line member of the rotatable joint of FIGS. 1 and 2, in accordance with some embodiments.
FIG. 3B is detail cross-sectional detail view of a vertical section of the fluid line member of FIG. 3A, in accordance with some embodiments.

FIG. 3A is a front perspective view of a conduit member 300 (sometimes referred to as first joint member) having the general form a fluid fitting with an elbow. The conduit member 300 defines a proximal end 301, a distal end 302, and a fluid lumen 303 extending through the conduit member 300 from the proximal end 301 to the distal end 302. For the purposes of description, the conduit member 300 defines a horizontal section 304 and a vertical section 305. The conduit member 300 includes an elbow 307. A conduit attachment member 309 disposed at the proximal end 301 facilitates fluid coupling of the conduit member 300 with a fluid conduit, (i.e., the fluid delivery conduit 131, the fluid return conduit 132, or any other fluid conduit). In some embodiments, the conduit attachment member 309 is configured to couple with an outside annular surface of the fluid conduit. In other embodiments, the conduit attachment member 309 may couple with a luminal surface of the fluid conduit.

FIG. 3B is a side cross-sectional detail view of a portion of the vertical section 305 of the conduit member 300. The vertical section 305 defines a longitudinal axis 306 which may extend through the center of the vertical section 305. The conduit member 300 includes various features, extending along the vertical section 305, configured to interact with corresponding features of a pad member 400 (see FIGS. 4A, 4B, and 5).

The conduit member 300 includes a first outside bearing surface 310 disposed on an outside circumference of the vertical section 305 defining a first diameter 311. The conduit member 300 also may include a second outside bearing surface 312 disposed on an outside circumference of the vertical section 305 defining a second diameter 312. In some embodiments, the second diameter 312 may be less than the first diameter 311. In other embodiments, the second outside bearing surface 312 may be omitted. In some embodiments, the longitudinal axis 306 may extend through the center of one or both of the first outside bearing surface 310 and the second outside bearing surface 312.

The conduit member 300 further includes an annular sealing surface 320 disposed on an outside circumference of the vertical section 305 defining a third diameter 321. The third diameter 321 may be equal to or less than the first diameter 311. The third diameter 321 may also be equal to or greater than the second diameter 312. In the illustrated embodiment, the annular sealing surface 320 is positioned between the first outside bearing surface 310 and the second outside bearing surface 312. In other embodiments, the annular sealing surface 320 may be positioned proximal the first outside bearing surface 310 or distal the second outside bearing surface 312. In some embodiments, the longitudinal axis 306 may extend through the center of the annular sealing surface 320.

The conduit member 300 includes a deflectable member 330. The deflectable member 330 may be configured to deflect inward toward the central axis 306 or the lumen 303. In other embodiments, the deflectable member 330 may be configured to deflect in an outward or lateral direction. In the illustrated embodiment, the deflectable member 330 is positioned distal the second outside bearing surface 312. In other embodiments, the deflectable member 330 may be positioned at any other location along the vertical section 305 with respect to any of the first outside bearing surface 310, the second outside bearing surface 312, and the sealing surface 320. In some embodiments, the conduit member 300 may include a slit 331 extending through a wall of the vertical section 305 to define a flexible portion of the vertical section 305 and thereby facilitate deflection of the deflectable member 330. In some embodiments, the conduit member 300 may include a single deflectable member 330. In other embodiments, the conduit member 300 may include multiple deflectable members 330. The deflectable member 330 may include a hook 332 and an angled surface 333 for interaction with corresponding features of the pad member 400 as further described below.

FIGS. 4A-4B illustrate a perspective view and a cross-sectional view of a pad member 400 (sometimes referred to as second joint member) of the rotatable joint 150, and FIG. 5, discussed below, illustrates a cross-sectional view of the pad 120, which provides a detailed illustration of the pad member 400. The pad member 400 may be formed of a flattened conical shape defining a top surface 401 at a proximal end, a bottom surface 402 at a distal end, and a conical surface 403 extending radially outward to a circumference edge 404. The pad member 400 includes various features, disposed within an opening 405, configured to interact with corresponding features of the conduit member 300 (see FIGS. 3A, 3B). The opening 405 defines a longitudinal axis 406 of the pad member 400.

The pad member 400 includes a first inside bearing surface 410 disposed on an inside circumference of the opening 405 defining a first inside diameter 411. The pad member 400 may also include a second inside bearing surface 412 disposed on an inside circumference of the opening 405 defining a second diameter 412. In some embodiments, the second diameter 412 may be less that the first diameter 411. In some embodiments, the longitudinal axis 406 may extend through the center of one or both of the first inside bearing surface 410 and the second inside bearing surface 412. In other embodiments, the second inside bearing surface 412 may be omitted.

The pad member 400 further includes a groove 420 disposed on an inside surface of the opening 405. In the illustrated embodiment, the groove 420 is positioned between the first inside bearing surface 410 and the second inside bearing surface 412. In other embodiments, the groove 320 may be positioned proximal the first inside bearing surface 410 or distal the second inside bearing surface 412.

The pad member 400 may further include a recess 430 disposed with the opening 405 adjacent the bottom surface 402. The recess 430 may define an inside diameter 431 that is greater than the second inside diameter 413 to define a ledge 432.

The conduit member 300 and the pad member 400 may be formed of the same material or different materials, including polyvinyl chloride (PVC), polypropylene, polyethylene, nylon-6 (polycaprolactam), Nylon 6-6, polyamides (PA), polycarbonates (PC), acrylonitrile butadiene styrene copolymer (ABS), polybutylene terephthalate (PBT), polyethylene terephthalate (PET), polyoxymethylene (POM) or any other suitable medical grade material.

Figure 5:
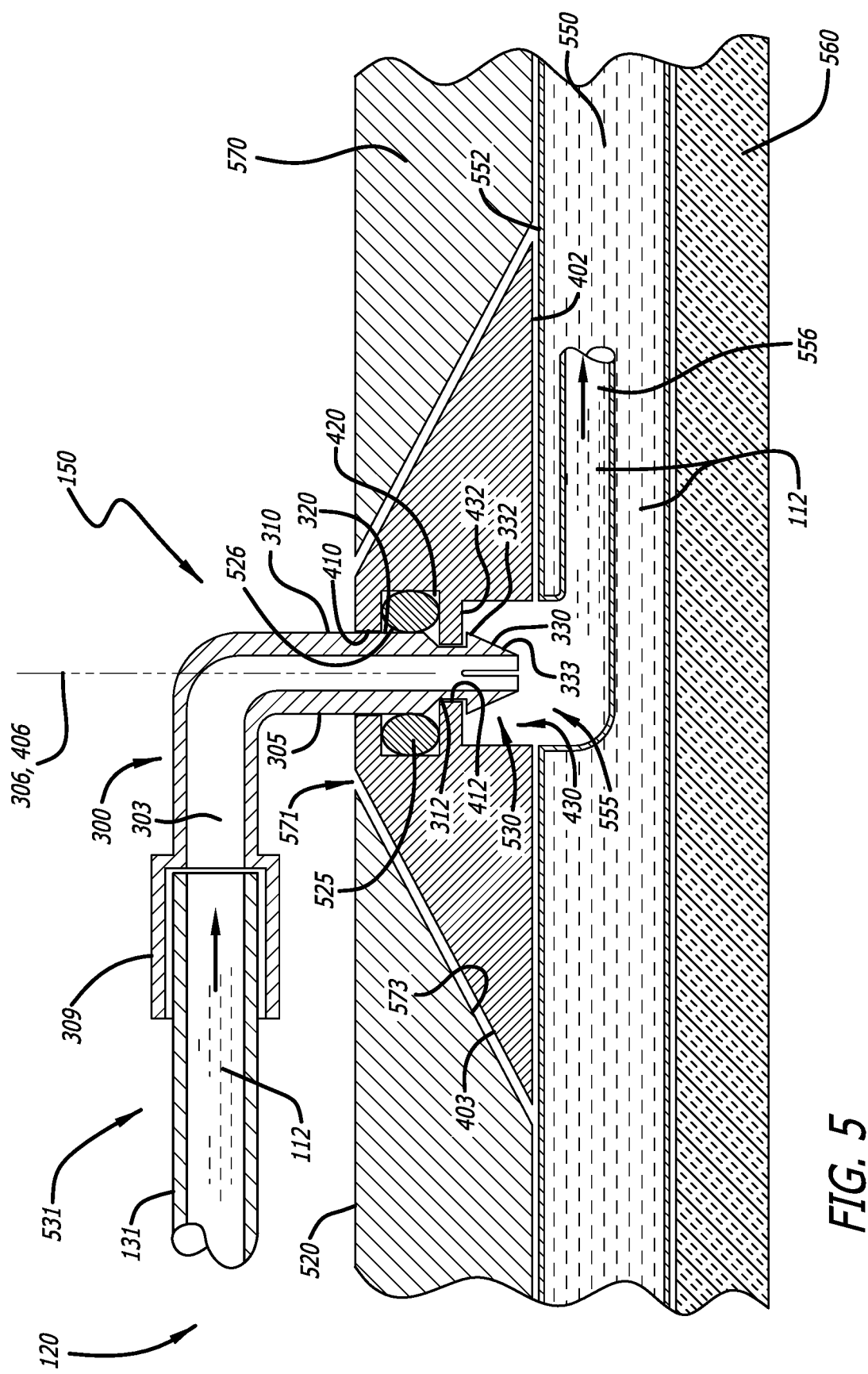
FIG. 5 is a cross-sectional view of a portion of the thermal pad of FIG. 2 cut along sectioning lines 5-5 illustrating the rotatable joint in an assembled state, in accordance with some embodiments.

FIG. 5 is a cross-sectional view of the pad 120 cut along sectioning lines 5-5 (see FIG. 2) illustrating a cross-sectional view of the rotatable joint 150. As illustrated, the vertical section 305 of the conduit member 300 is disposed within the opening 405 of the pad member 400. When assembled, the longitudinal axis 306 of the conduit member 300 may be coincident with the longitudinal axis 406 of the pad member 400 so that the conduit member 300 is rotatable with respect to the pad member 400.

The conduit member 300 is coupled with the fluid delivery conduit 131 via the conduit attachment member 309 to: 1) establish fluid communication between a lumen of the fluid delivery line 131 and the lumen 303; and 2) physically attach the conduit member 300 to the fluid delivery conduit 131. As shown, the elbow 307 of the conduit member 300 defines an orientation of the horizontal section 304 to be substantially parallel to a top side 520 of the pad 120. The elbow 307, in turn, defines an orientation of a distal portion 531 of the fluid delivery conduit 131 to parallel to the top side 520. Also shown, the conduit member 300 may be configured to position the distal portion 531 of the fluid delivery conduit 130 immediately adjacent to the top side 520 or in contact with the top side 520. In some embodiments, the conduit member 300 may be configured to position the distal portion 531 of the fluid delivery conduit 130 within about 2 to 10 mm of the top side 520.

As stated above, the vertical section 305 (or at least a portion thereof) of the conduit member 300 may be disposed within the opening 405 of the pad member 400 to facilitate functional interaction between various corresponding features of the conduit member 300 and the pad member 400. As shown, the first outside bearing surface 310 of the conduit member 300 is disposed adjacent to the first inside bearing surface 410 of the pad member 400 to define a face to face relationship between the first outside bearing surface 310 and the first inside bearing surface 410. As such, when the conduit member 300 is rotated with respect to the pad member 400, the first outside bearing surface 310 slidably displaces relative to the first inside bearing surface 410.

Similarly, the second outside bearing surface 312 of the conduit member 300 is disposed adjacent to the second inside bearing surface 412 of the pad member 400 to define a face to face relationship between the second outside bearing surface 312 and the second inside bearing surface 412. As such, when the conduit member 300 is rotated with respect to the pad member 400, the second outside bearing surface 312 slidably displaces relative to the second inside bearing surface 412.

In further similar fashion, the annular sealing surface 320 of the conduit member 300 is positioned adjacent to the groove 420 of the pad member 400 so that a sealing member 525 disposed within the groove 420 defines a fluid seal between the conduit member 300 and the pad member 400. The groove 420 and the sealing member 525 are correspondingly sized to define an interference fit between the sealing member 525 and the annular sealing surface 320. The sealing member 525 in combination with the groove 420 defines a dynamic fluid seal with the annular sealing surface 320 so that when the conduit member 300 is rotated with respect to the pad member 400, the annular sealing surface 320 slidably displaces relative to the sealing member 525. In some embodiments, a lubricant 526 may be disposed between the annular sealing surface 320 and the sealing member 525 to minimize a sliding friction between the annular sealing surface 320 and the sealing member 525.

The sealing member 525 may be formed of a toroidal shape. In some embodiments, the sealing member 525 may define a circular cross-sectional area of revolution such as a torus. In some embodiments, the sealing member 525 may be an O-ring. In other embodiments, sealing member 525 may define a non-circular area of revolution, such as an X-shape. In some embodiments, the sealing member 525 may define a lip seal. Of course, any other shapes of the area of revolution as may be suitable to define the dynamic seal are included in this disclosure. The sealing member may be formed of any suitable sealing material including silicone, rubber, ethylene propylene diene monomer (EPDM), and the like. In some embodiments, the rotatable joint may include more than one sealing member 525.

As will be appreciated by one of ordinary skill, other arrangements of the annular sealing surface 320, the sealing member 525, and the groove 420 may provide for the dynamic fluid seal between the conduit member 300 and the pad member 400 without departing from the spirit of the invention. For example, in some embodiments, the groove 420 may be disposed on the vertical section 305, and the annular sealing surface 320 may be disposed on an inside surface of the opening 405.

In some embodiments, the interaction between the sealing member 525 and the annular sealing surface 320 may define sliding bearing between the conduit member 300 and the pad member 400 similar to the sliding bearing defined first inside bearing surface 410 and the first outside bearing surface 310. In such an embodiment, the sliding bearing defined by the second inside bearing surface 412 and the second outside bearing surface 312 may be omitted.

With further reference to FIG. 5, the deflectable member 330 may be disposed within the recess 430. The hook 332 is shown disposed in overlapping engagement with the ledge 432 to define a snap-fit retention mechanism 530. The retention mechanism 530 prevents separation of the conduit member 300 from the pad member 400 once assembled. Placement of the retention mechanism 530 within the recess 430 may make the deflectable member inaccessible to a user, thereby preventing disassembly by the user.

Assembly of the joint 150 may be performed simply by linearly displacing the conduit member 300 relative to the pad member 400 so that the vertical section 350 of the conduit member 300 is inserted within the opening 405 of the pad member until the hook 332 is inserted beyond the ledge 432. In other words, securing conduit member 300 to the pad member 400 may require only linear displacement of the conduit member 300 relative to the pad member 400. During insertion, the angled surface 333 of the deflectable member 330 may engage with the second inside bearing surface 412 to cause inward deflection of the deflectable member 330, i.e., toward the longitudinal axis 306 or the lumen 303.

With further reference to the FIG. 5, the pad may include multiple layers to provide for multiple functions of the pad 120. A fluid containing layer 550 is shown fluidly coupled with the fluid delivery conduit 131 via the rotatable joint 150 to facilitate circulation of the TTM fluid 112 within the fluid containing layer 550. The pad member 400 is coupled with the fluid containing layer 550 so that the opening 405 is aligned with a fluid inlet 555 of the fluid containing layer 550. The bottom surface 402 of the pad member 400 is sealably attached to a top surface 552 of the fluid containing layer 550. The attachment may include radio-frequency (RF) welding, ultra-sonic welding, adhesive bonding or any other suitable attachment process. The fluid inlet 555 may be coupled with an internal fluid conduit 556 of the fluid containing layer 550 so that TTM fluid 112 entering the fluid containing layer 550 passes through the internal fluid conduit 556.

In some embodiments, the conical structure of the pad member 400 may define a flexibility of the pad member 400 adjacent the circumferential edge 404. In other words, a thickness along the circumferential edge 404 may be sufficiently thin to allow the pad member 400 flex along with the portion of the fluid containing layer 550 attached thereto. The flexibility of the pad member 400 may define a soft connection to the fluid containing layer 550 to form a strain relief between the pad member 400 and fluid containing layer 550 along the circumferential edge 404.

A thermal conduction layer 560 is coupled with the fluid containing layer 550 on a bottom side thereof so as to be disposed between the fluid containing layer 550 and the patient's skin 51 (FIG. 1) during the TTM therapy. An insulation layer 570 is coupled with the top side 552 of the fluid containing layer 550. The insulation layer 570 is configured to inhibit thermal energy transfer between the fluid containing layer 550 and the environment. In some embodiments, the insulation layer 570 may include one or more openings extending through the insulation layer 570 such as the opening 571 to provide for coupling of the fluid conduit 131 with the fluid containing layer 550. More specifically, the rotatable joint 150 may be disposed through the opening 571. In some embodiments, the opening 571 may be conically shaped defining an inside conical surface 573. The inside conical surface 573 may be sized to correspond with the conical surface 403 so that, when the pad 120 is assembled, the inside conical surface 573 is disposed in a face to face relationship with the conical surface 403. In some embodiments, the insulation layer 570 may be attached to the pad member 400.

A method of manufacture of the pad 120 may include one or more of the following steps or process. The conduit member 300 may be attached to the fluid delivery conduit 131 and the pad member 400 may be attached to the fluid containing layer 550. The insulation layer 570 may be attached to the fluid containing layer 550 so that the opening 571 of the insulation layer 570 is aligned with the opening 405 of the pad member 400. The sealing member 525 may be placed within the groove 420. Lubrication 526 may be applied to the sealing member 525 or the annular sealing surface 320 of the conduit member 300. The conduit member 300 may be displaced linearly relative to the pad member 400 so that the vertical section 305 is inserted within the opening 405. During insertion, the deflectable member 330 may deflect inward due to engagement of the angled surface 333 with the second inside bearing surface 412. The insertion may continue until the angled surface 333 disengages the second inside bearing surface 412 allowing the deflectable member 330 to self-deflect outward causing the hook 332 to overlap the ledge 432.

In some embodiments, one or more steps of manufacturing described above may be performed at a first location such as a manufacturing facility, and one or more other steps may be performed at a second location such as a patient care facility. In an embodiment, the steps of attaching the conduit member 300 to the fluid delivery conduit 131, attaching the pad member 400 to the fluid containing layer 550, attaching insulation layer 570 to the fluid containing layer 550, and placing the sealing member 525 within the groove 420 may be performed at the manufacturing facility. The step of linearly displacing the conduit member 300 relative to the pad member 400 so that the vertical section 305 is inserted within the opening 405 may be performed at the patient care facility by the clinician.

Figure 6A:
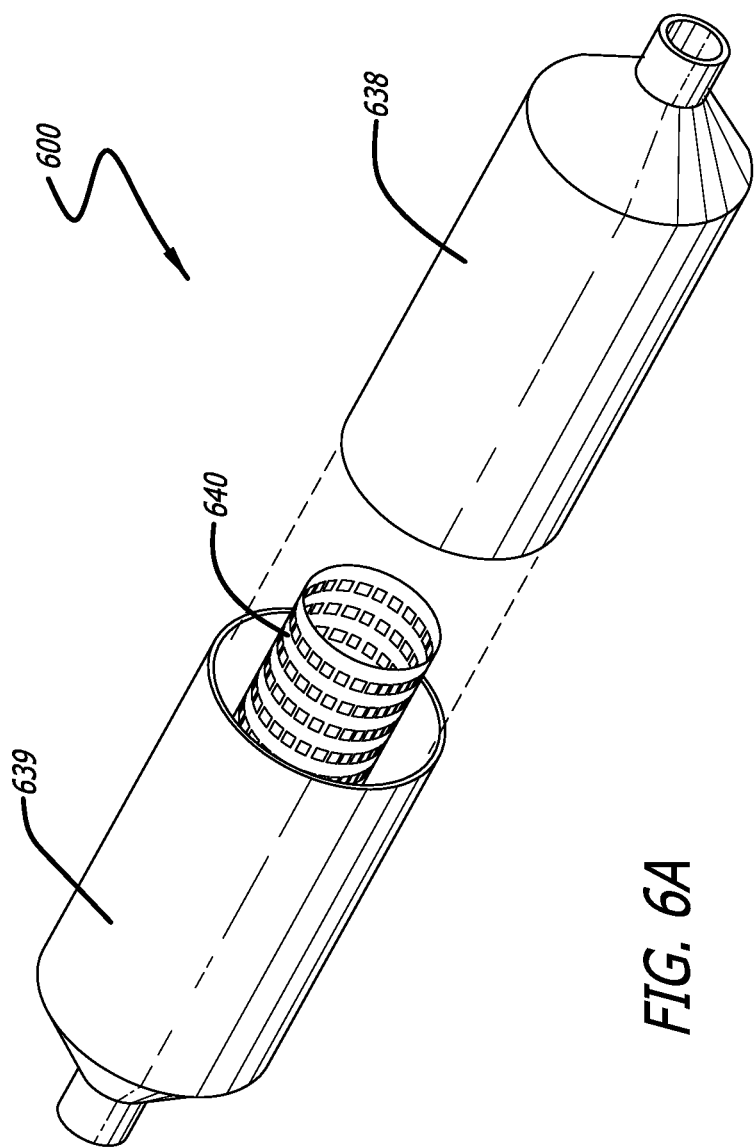
FIG. 6A is an exploded perspective view of a TTM fluid filter, in accordance with some embodiments.
Figure 6B:
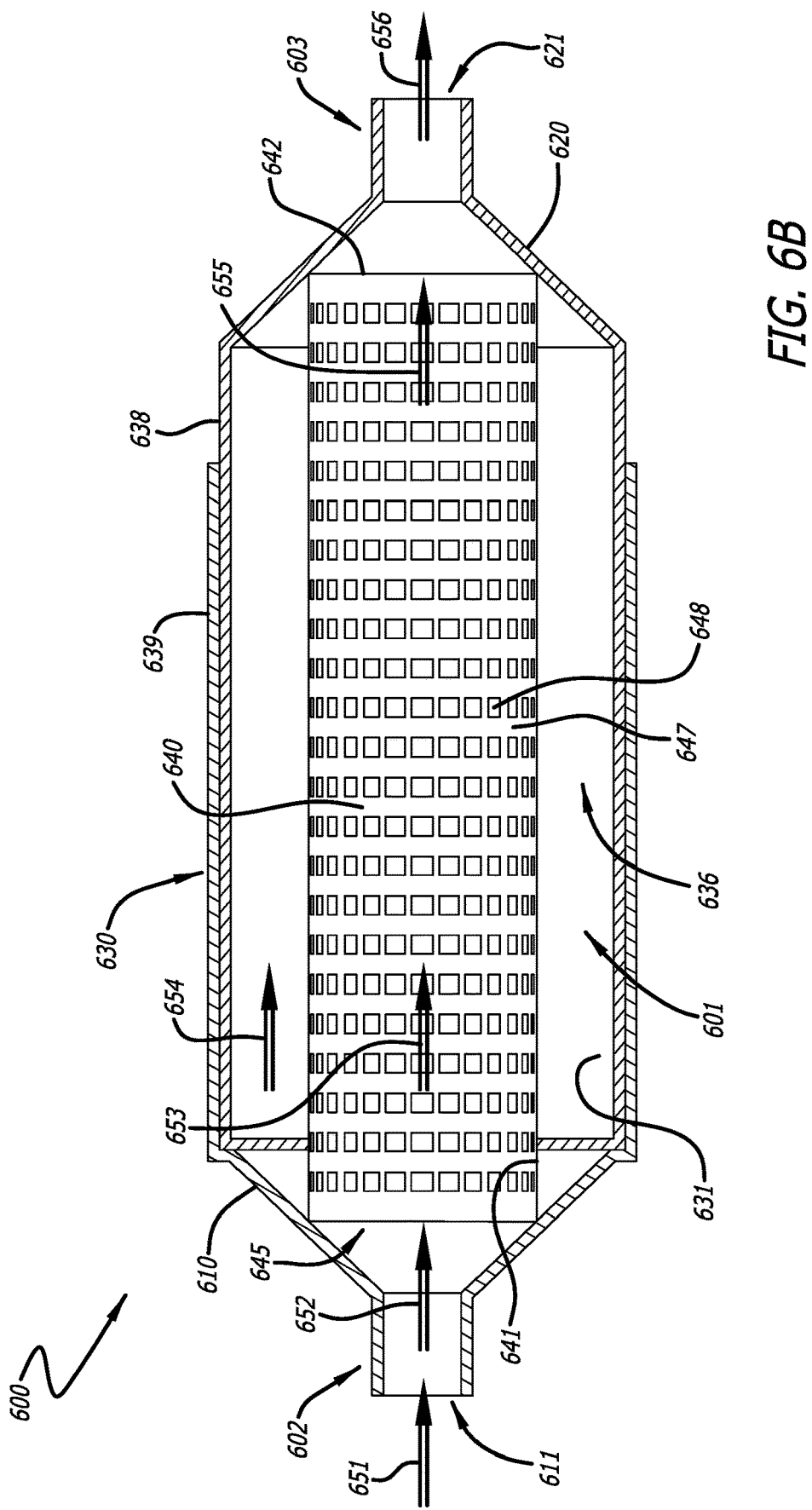
FIG. 6B is a cross-sectional side view of the filter of FIG. 6A, in accordance with some embodiments.

FIGS. 6A and 6B show a filter 600 that may be included with the TTM system 100. The filter 600 may be disposed in line with a TTM fluid flow path of the TTM system 100 so that the circulating TTM fluid 112 flows through the filter 600. The filter 600 may be configured to remove (i.e., filter out) material/particles having a size of 0.2 microns or larger from the TTM fluid 112 without causing a flow restriction of the TTM fluid 112.

The filter 600 includes a longitudinal shape having a flow path 601 extending from a first end 602 to a second end 603. The filter 600 includes a diffuser 610 adjacent the first end 602, a nozzle adjacent 620 the second end 603, and a body 630 extending between the diffuser 610 and the nozzle 620. Along the diffuser 610, a cross-sectional flow area of the filter 600 expands from an inlet flow area 611 to a body flow area 631 and along the nozzle 620, the cross-sectional flow area of the filter 600 contracts from the body flow area 631 to an outlet flow area 621. In some embodiments, the inlet flow area 611 and the outlet flow area 621 may be substantially equal.

In some embodiments, the body flow area 631 may be constant along the body 630. In other embodiments, the body flow area 631 may vary along a length of the body 630 such that the body flow area 631 is greater or less along middle portion of the body 630 than at the ends of the body 630. In some embodiments, the body flow area 631 may be circular.

The filter 600 includes an inner tube 640 disposed within the body 630 extending along the length of body 630. The inner tube 640 may be coupled with the diffuser 610 at a first inner tube end 641 so that TTM fluid 112 entering the filter 600 at the first end 602 also enters the inner tube 640 at the first inner tube end 641. The inner tube 640 may be coupled with the nozzle 620 at a second inner tube end 642 so that TTM fluid 112 exiting the filter 600 at the second end 603 also exits the inner tube 640 at the second inner tube end 642.

The inner tube 640 includes an inner tube flow area 645 extending the length of the inner tube 640. The inner tube flow area 645 may be greater than the inlet flow area 611 and/or the outlet flow area 621. The inner tube flow area 645 may be constant along the length of the inner tube 640. In some embodiments, the inner tube flow area 645 may vary along the length of the inner tube 640. In some embodiments, the inner tube 640 may include a circular cross section. The inner tube 640 and the body 630 may be configured so that the body flow area 631 includes a combination of the inner tube flow area 645 and an annular flow area 636.

The inner tube 640 includes a porous a circumferential wall 647. The porous wall 647 may be configured so that TTM fluid 112 may flow through the porous wall 647, i.e., through the pores 648 of the porous wall 647. Consequently, TTM fluid 112 may flow through the porous wall 647 from the inner tube flow area 645 to the annular flow area 636 and from the annular flow area 636 into the inner tube flow area 645.

In use, the longitudinal velocity of the TTM fluid 112 may change along the length of the filter 600. As the volumetric TTM fluid 112 flow through the filter is constant, the longitudinal velocity of the TTM fluid 112 may be at least partially defined by the flow areas of the filter 600 as described below. The TTM fluid 112 may enter the filter 600 at a first longitudinal velocity 651 and decrease along the diffuser so that the TTM fluid 112 enters the inner tube at a second velocity 652 less than the first longitudinal velocity 651. At this point, a portion of the TTM fluid 112 may flow through the porous wall 647 from the inner tube flow area 645 into the annular flow area 636 to divide the fluid flow into a third velocity 653 within the inner tube flow area 645 and a fourth velocity 654 within the annular flow area 636. The fourth velocity 654 may be less than the third velocity 653. A portion of the TTM fluid 112 may then flow back into the inner tube flow area 645 from the annular flow area 636 to define a fifth velocity 655 along the inner tube flow area 645 which may be about equal to the second velocity 652. The TTM fluid 112 may then proceed along the nozzle 620 to define a sixth velocity 656 exiting the filter 600. In some embodiments, the first velocity 651 and the sixth velocity 656 may be about equal.

The filter 600 may be configured to remove harmful bacteria and viruses from the TTM fluid 112 using sedimentation principles. In use, the filter 600 may be oriented horizontally so that the direction of fluid flow through the filter 600 is perpendicular to a gravitational force 665. In some instances, bacteria, viruses, and other particles within the TTM fluid 112 may have a greater density than the TTM fluid 112 and as such may be urged by the gravitational force 665 (i.e., sink) in a direction perpendicular to the fluid flow direction. In some instances, particles within the inner tube flow area 645 may sink toward and through the porous wall 647 into the annular flow area 636. Particles within the annular flow area 636 may then sink toward an inside surface 631 of the body 630 and become trapped adjacent the inside surface 631. The geometry of the filter 600 may be configured to allow 0.2-micron bacteria/virus particles to fall out of the flow of TTM fluid 112 and become trapped along the inside surface 631.

In some embodiments, the filter 600 may be configured so that flow of TTM fluid 112 from the inner tube flow area 645 into the annual flow area 636 my drag particles through the porous wall 647. In some embodiments, the inlet flow area 611, the inner tube flow area 645, and the annual flow area 636 may be sized so that the third velocity 653 is less than about 50 percent, 25 percent, or 10 percent of the first velocity 651 or less. In some embodiments, the body 630 and the inner tube 640 may be configured so that the fourth velocity 654 is less than the third velocity 653. In some embodiments, the fourth velocity 654 may less than about 50 percent, 25 percent, or 10 percent of the third velocity 653 or less.

In some embodiments, the filter 600 may be configured so that the flow within the inner tube flow area 645 is laminar flow, i.e., so that the velocity of the fluid flow adjacent to or in close proximity to an inside surface 641 of the porous wall 647 is less than the velocity at a location spaced away from the inside surface 641. In such an embodiment, the particles may more readily sink toward and through the porous wall 647.

In some embodiments, the filter 600 may be configured so that the fluid flow within the annual flow area 636 is laminar flow, i.e., so that the velocity of the fluid flow adjacent to or in close proximity to inside surface 631 of the body 630 is less than the velocity at a location spaced away from the inside surface 631. In such an embodiment, the particles may more readily sink toward and be trapped along the inside surface 631.

The filter 600 may include three components including the inner tube 640 an inner body shell 638, and an outer body shell 639. Each of the three components may be formed via the plastic injection molding process. Assembly of the filter 600 may include capturing the inner tube 640 within the inner body shell 638 and the outer body shell 639 and sliding the inner body shell 638 into the outer body shell 639 wherein the fit between the inner body shell 638 and the outer body shell 639 is an interference fit.

Figure 6C:
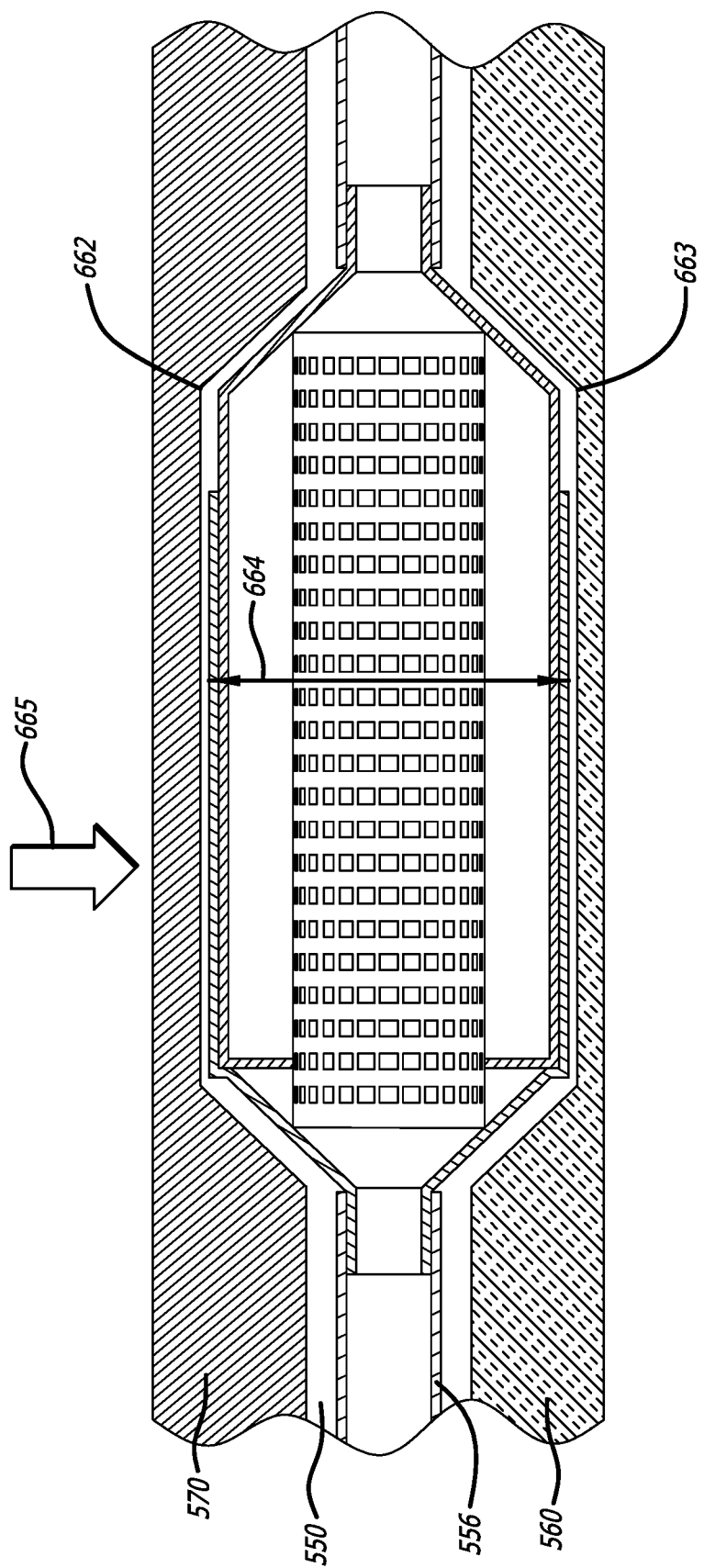
FIG. 6C is a cross-sectional detail view of the thermal contact pad of FIG. 2 incorporating the filter of FIG. 6A, in accordance with some embodiments.

In some embodiments, the filter 600 may be disposed within the pad 120. FIG. 6C shows a detail cross-sectional view of the pad 120 including the filter 600 disposed within the fluid containing layer 550. The filter 600 is coupled in line with the internal fluid conduit 556 within the fluid containing layer 550 so that TTM fluid 12 circulating within the pad 120 passes through the filter 600. The filter 600 may be sized so that the inlet flow area 611 and the outlet flow area 621 are similar to a cross-sectional flow area of the internal flow path 660 within the fluid containing layer 550.

In some embodiments, a thickness of the fluid containing layer 550 may increase adjacent the filter 600 to accommodate a body diameter 664 of the filter 600. To further accommodate the body diameter 664, the insulation layer 410 and/or the thermal conduction layer 430 may include internal depressions 662, 663, respectively.

In some embodiments, one or more filters 600 may be disposed in line with the flow of TTM fluid 112 at other locations of the TTM system 100. In some embodiments, one or more filters 600 may be disposed within the TTM module 110. In some embodiments, one or more filters 600 may be disposed in line with the FDL 130. In some embodiments, the filter 600 may be disposed in line with a fluid conduit of the pad external to the fluid containing layer 550 such as a conduit extending between the pad connector 652 and the pad 120.

Figure 7:
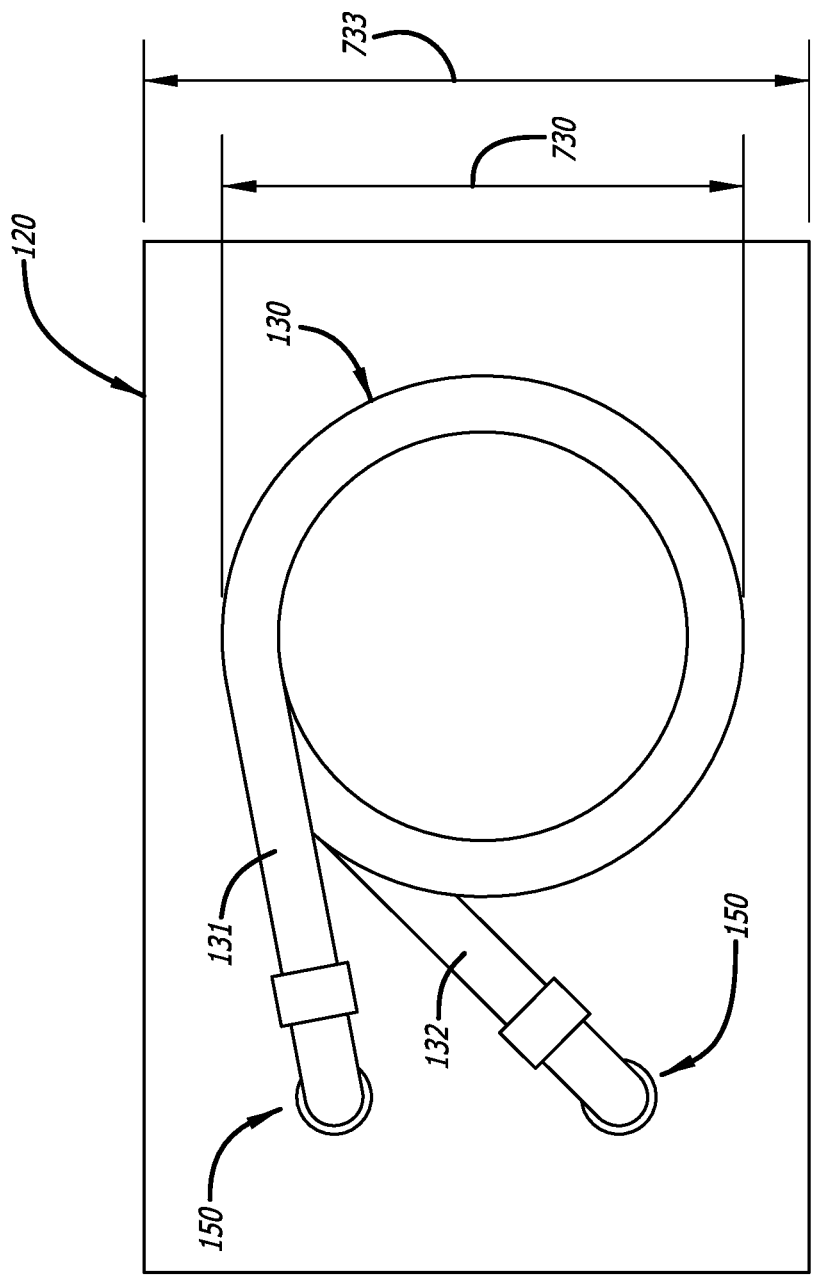
FIG. 7 is a top view of the thermal contact pad of FIG. 2 disposed in a packaging configuration, in accordance with some embodiments.

FIG. 7 is a top view of the thermal pad 120 disposed in packaging configuration showing the fluid delivery conduit 131 and the fluid return conduit 132 each coupled with the pad 120 via a rotatable joint 150. The joints 150 have been rotated to orient the fluid delivery conduit 131 and the fluid return conduit 132 in a direction substantially along a side of the pad 120 in contrast to a direction extending away from the pad 120. The fluid deliver line 130 is disposed in a coiled configuration. In some embodiments, the outside diameter 730 of the coil may be less than a width 733 of the pad 120 so that the fluid deliver line 130 is disposed within a circumference of the pad 120. The thermal pad 120 when disposed in the packaging configuration as shown and described, may provide for placement of the pad 120 within a packaging container such as a box or bag having minimal dimensions while maintain the pad 120 in a non-folded state.

A method of using of the pad 120 may include one or more of the following steps or process. The FDL 130 may un-coiled from a coiled packaging state. The FDL 130 including the fluid delivery conduit 131 and the fluid return conduit 132 may be rotated via the rotatable joints 150 to orient the FDL 130 in a first orientation defining a direction of the FDL 130 that is advantageous for coupling the FDL 130 to the TTM module 110 and placement of the pad 120 on the patient 50. The clinician may reposition the pad 120 on the patient 50 away from the first position toward a second position that may include angular rotation of the pad 120. In consequence, the clinician may rotate the FDL 130 away from the first orientation toward a second orientation, where in the second orientation is advantageous for extending the FDL 130 toward the TTM module 110 with the pad 120 disposed in the second position.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

What is claimed is:

1. A medical pad for exchanging thermal energy between a targeted temperature management (TTM) fluid and a patient, the medical pad comprising:
a fluid containing layer having a top side and a bottom side, wherein:
the fluid containing layer is configured for containing the TTM fluid,
the fluid containing layer comprises a fluid inlet and a fluid outlet, and
the TTM fluid is circulatable within the fluid containing layer from the fluid inlet to the fluid outlet; and
a fluid conduit attached to one of the fluid inlet or the fluid outlet via a rotatable joint, the rotatable joint configured to facilitate rotation of the fluid conduit with respect to the medical pad, wherein:
the rotatable joint comprises:
a first joint member attached to the fluid conduit, the first joint member comprising a first outside annular surface; and
a second joint member attached to the fluid containing layer, the second joint member comprising an opening including a first inside annular surface having a first diameter,
the first joint member is rotatable with respect to the second joint member, and
the first outside annular surface is disposed in sliding engagement with the first inside annular surface.

2. The medical pad according to claim 1, wherein the rotatable joint comprises a lumen extending through the rotatable joint, the lumen establishing fluid communication between the fluid conduit and the fluid containing layer.

3. The medical pad according to claim 1, wherein the first joint member comprises an elbow configured to establish parallel orientation of a distal portion of the fluid conduit with respect to the medical pad.

4. The medical pad according to claim 1, wherein a portion of one of the first joint member or the second joint member is disposed with an opening of another of the first joint member or the second joint member.

5. The medical pad according to claim 1, wherein the rotatable joint comprises a sealing member disposed between the first joint member and the second joint member, the sealing member configure to define a dynamic fluid seal between the first joint member and the second joint member.

6. The medical pad according to claim 5, wherein at least one of the first joint member or the second joint member comprises an annular groove containing the sealing member, and wherein another of the first joint member or the second joint member comprises an annular sealing surface disposed in interfering contact with the sealing member.

7. The medical pad according to claim 5, wherein during rotation of the first joint member with respect to the second joint member, an annular sealing surface is displaced with respect to the sealing member.

8. The medical pad according to claim 5, wherein the rotatable joint includes a lubricant disposed between an annular sealing surface and the sealing member.

9. The medical pad according to claim 5, wherein the sealing member is formed of a toroidal shape.

10. The medical pad according to claim 6, wherein the sealing member is an O-ring.

11. The medical pad according to claim 5, wherein the rotatable joint comprises more than one sealing member.

12. The medical pad according to claim 8, wherein during assembly of the first joint member with the second joint member, the annular sealing surface is longitudinally displaced with respect to a sealing member.

13. The medical pad according to claim 1, wherein the second joint member is attached to an outside surface of the fluid containing layer.

14. The medical pad according to claim 1, wherein the first joint member is configured to couple to the second joint member via a snap-fit retention mechanism.

15. The medical pad according to claim 14, wherein the snap-fit retention mechanism comprises at least one deflectable member.

16. The medical pad according to claim 15, wherein the snap-fit retention mechanism comprises more than one deflectable member.

17. The medical pad according to claim 14, wherein the snap-fit retention mechanism is disposed within an opening of the second joint member.

18. The medical pad according to claim 15, wherein the first joint member comprises the at least one deflectable member of the snap-fit retention mechanism.

19. The medical pad according to claim 18, wherein the at least one deflectable member is biased radially outward from a lumen.

20. The medical pad according to claim 1, wherein:
the opening comprises a second inside annular surface having a second diameter,
the first joint member comprises a second outside annular surface, and
the second outside annular surface is disposed in sliding engagement with the second inside annular surface.

21. The medical pad according to claim 20, wherein the first inside annular surface is disposed adjacent a top side of the second joint member, and wherein the second diameter is less than the first diameter.

22. The medical pad according to claim 21, wherein the opening comprises a recess extending upward from a bottom side of the second joint member, the recess defining a third diameter, and wherein the third diameter is greater than the second diameter.

23. The medical pad according to claim 19, wherein when the first joint member is coupled with the second joint member, at least a portion of the at least one deflectable member is disposed within a recess.

24. The medical pad according to claim 1, wherein the rotatable joint is configured to facilitate assembly of the first joint member with the second joint member via longitudinal displacement of the first joint member with respect to the second joint member.

25. The medical pad according to claim 24, wherein the first joint member includes at least one deflectable member comprising an angled surface configured to engage a second annular surface during assembly of the first joint member with the second joint member, and wherein engagement of the angled surface causes the at least one deflectable member to deflect radially inward toward to the lumen.

26. The medical pad according to claim 1, further comprising an insulation layer disposed on the top side of the fluid containing layer, and wherein the rotatable joint is disposed through an opening in the insulation layer.

27. The medical pad according to claim 26, wherein at least a portion of the second joint member is disposed between the insulation layer and the fluid containing layer.

28. The medical pad according to claim 1, wherein the medical pad comprises a filter coupled to the fluid containing layer so that TTM fluid circulating through the fluid containing layer passes through the filter.

29. The medical pad according to claim 28, wherein the filter comprises a porous wall disposed parallel to a continuous flow path through the filter.

* * * * *